(12) United States Patent
Plancherel et al.

(10) Patent No.: US 12,001,620 B2
(45) Date of Patent: Jun. 4, 2024

(54) WIRELESS CHARGING FOR AN INPUT DEVICE

(71) Applicant: Logitech Europe S.A., Lausanne (CH)

(72) Inventors: Laurent Plancherel, Lausanne (CH); Thomas Marriott-Dodington, Geneva (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/958,255

(22) Filed: Sep. 30, 2022

(65) Prior Publication Data

US 2024/0111374 A1 Apr. 4, 2024

(51) Int. Cl.
| | |
|---|---|
| *G06F 3/039* | (2013.01) |
| *G06F 3/0354* | (2013.01) |
| *G06F 3/038* | (2013.01) |
| *H02J 7/00* | (2006.01) |
| *H02J 7/34* | (2006.01) |
| *H02J 50/10* | (2016.01) |

(52) U.S. Cl.
CPC ........ *G06F 3/0395* (2013.01); *G06F 3/03543* (2013.01); *G06F 3/038* (2013.01); *H02J 7/00712* (2020.01); *H02J 7/345* (2013.01); *H02J 50/10* (2016.02); *H02J 2207/20* (2020.01)

(58) Field of Classification Search
CPC .... G06F 3/0395; G06F 3/03542; G06F 3/038; H02J 50/10; H02J 7/00712; H02J 7/345; H02J 2207/20
See application file for complete search history.

(56) References Cited

U.S. PATENT DOCUMENTS

| | | | | |
|---|---|---|---|---|
| 2015/0249342 | A1* | 9/2015 | Kapcia | H04B 5/0037 307/104 |
| 2016/0331257 | A1* | 11/2016 | Baumann | G16H 40/67 |
| 2020/0287416 | A1* | 9/2020 | Sauterel | H02J 50/005 |

* cited by examiner

*Primary Examiner* — Robert J Michaud
(74) *Attorney, Agent, or Firm* — Kilpatrick Townsend & Stockton LLP

(57) ABSTRACT

A method comprises: determining whether an external wireless power (EWP) source is coupled to an interface configured to transfer power from the EWP source to the power management (PM) system; selecting the EWP to power the computer mouse when the EWP source is electrically couples and provides power to the interface; determining whether a fixed internal power source (PS) is coupled to the PM system; selecting a fixed internal PS to power the computer mouse when the fixed internal PS is coupled to the PM system and the EWP source is coupled to but not providing enough power to the interface; determining whether a removeable internal PS is electrically coupled to a PM system in the computer mouse; and selecting the removeable internal PS to power the computer mouse when the removeable internal PS is electrically coupled to the PM system and the EPS is not coupled to the interface.

15 Claims, 13 Drawing Sheets

WIRELESS CHARGING FOR AN INPUT DEVICE

CROSS-REFERENCES PARAGRAPH FOR RELATED APPLICATIONS

The following regular U.S. patent applications (including this one) are being filed concurrently, and the entire disclosure of the other applications are incorporated by reference into this application for all purposes:

application Ser. No. 17/958,255, filed Sep. 30, 2022, entitled "WIRELESS CHARGING FOR AN INPUT DEVICE"; and application Ser. No. 17/958,256, filed Sep. 30, 2022, entitled "WIRELESS CHARGING FOR AN INPUT DEVICE".

BACKGROUND

Wireless peripheral devices (e.g., computer mice, keyboards, speakers, ear buds, smart wearables, etc.) are widely used and can provide portability and convenience, but may be subject to poor battery life. Although battery technology continues to improve, most contemporary peripheral devices require a charging cable to periodically recharge internal rechargeable batteries, which can be cumbersome, limiting, and can require the use of a hardwired cable to be used with wireless technology, which can defeat the purpose of the wireless technology in general. Furthermore, the rechargeable battery (e.g., lithium-ion battery) and related charging infrastructure (e.g., input/output port) may add considerable manufacturing cost and weight to the device, which is generally not preferable in higher end gaming peripheral devices. Better solutions are needed.

BRIEF SUMMARY

In certain embodiments, a computer mouse comprises: a housing configured to receive a removable first charge storage device; an interface configured to wirelessly receive power from an external power source; a second charge storage device; and a multiplexor (MUX) including: an output coupled to one or more processors; and a set of inputs coupled to the first charge storage device, the interface, and the second charge storage device. The MUX can be configured to electrically couple the interface to the one or more processors based on a determination that the external power source is electrically coupled to and providing power to the interface; the MUX can be configured to electrically couple the second charge storage device to the one or more processors based on a determination that the external power source is electrically coupled to the interface but is not currently providing power to the interface; and the MUX can be configured to electrically couple the first charge storage device to the one or more processors based on a determination that the first charge storage device is electrically coupled to the MUX and the external power source is not coupled to or not providing power to the interface. In some aspects, the removable first charge storage device can be a removable battery, and the first charge storage device can be determined to be electrically coupled to the MUX when the first charge storage device has a voltage supply level above a threshold value (or when detected to be simply coupled thereto). The interface can be configured to receive a removable modular insert that, when inserted into the interface, enables the computer mouse to wirelessly receive power from the external power source. The external power source can be a charging mouse pad configured to wirelessly provide power to the interface via electromagnetic induction when the computer mouse is placed on or near the charging mouse pad. The second charge storage device (e.g., a supercapacitor) can be configured to be charged by the external power source via a charging circuit. In some embodiments, the charging circuit includes a current limiter comprising: a first low-dropout voltage (LDO) regulator circuit that is biased in a floating output configuration; a second LDO regulator circuit configured to regulate its output voltage to a level that is within a normal operational range of the second charge storage device, wherein the first LDO regulates its output voltage across an output resistor thereby generating a constant current that passes through the second LDO and charges the second charge storage device until the second LDO reaches and regulates at a predetermined voltage, thereby causing the first LDO to stop regulating until the output of the second LDO drops below the predetermined voltage. In certain embodiments, a total allowed current supplied by the external power source is between 40-60 mA, wherein the external power source is configured to simultaneously provide power to the one or more processors and charge the second charge storage device without exceeding the total allowed current.

In some embodiments, a method of operating a computer mouse comprises: determining whether an external wireless power source is coupled to an interface configured to transfer power from the external wireless power source to the power management system selecting the external wireless power source to power the computer mouse based on a determination that the external wireless power source is electrically coupled to and providing power to the interface; determining whether a fixed internal power source is coupled to the power management system; selecting a fixed internal power source to power the computer mouse based on a determination that the fixed internal power source is coupled to the power management system and the external wireless power source is coupled to but not providing enough power to the interface; determining whether a removeable internal power source is electrically coupled to a power management system in the computer mouse; and selecting the removeable internal power source to power the computer mouse based on a determination that the removeable internal power source is electrically coupled to the power management system and the external power source is not coupled to the interface. In some aspects, the removeable internal power source is a removable charge storage device, and wherein the removeable internal power source is determined to be electrically coupled to the power management system when the removeable internal power source has a voltage supply level above a threshold value. In some embodiments, the external power source is a charging mouse pad configured to wirelessly provide power to the power management system via electromagnetic induction when the computer mouse is placed on or near the charging mouse pad. The fixed internal power source may be a charge storage device (e.g., supercapacitor) configured to be charged by the external power source via a charging circuit. In some implementations, the charging circuit includes a current limiter comprising: a first low-dropout voltage (LDO) regulator circuit that is biased in a floating output configuration; a second LDO regulator circuit configured to regulate its output voltage to a level that is within a normal operational range of the fixed internal power source, wherein the first LDO regulates its output voltage across an output resistor thereby generating a constant current that passes through the second LDO and charges the second internal power source until the second LDO reaches and regulates at a predetermined voltage, thereby causing the first LDO to stop regulating until the output of the second LDO drops below the predetermined voltage. In some aspects, a total allowed current supplied by the external power source is between 40-60 mA, wherein the external power source is configured to simultaneously provide power to the power management system and charge the fixed internal power source without exceeding the total allowed current.

In further embodiments, a system comprises: one or more processors; one or more machine-readable, non-transitory storage mediums that include instructions configured to cause the one or more processors to perform operations including: determining whether an external wireless power source is coupled to an interface configured to transfer power from the external wireless power source to the power management system; selecting the external wireless power source to power the computer mouse based on a determination that the external wireless power source is electrically coupled to and providing power to the interface; determining whether a fixed internal power source is coupled to the power management system; selecting a fixed internal power source to power the computer mouse based on a determination that the fixed internal power source is coupled to the power management system and the external wireless power source is coupled to but not providing enough power to the interface; determining whether a removeable internal power source is electrically coupled to a power management system in the computer mouse; and selecting the removeable internal power source to power the computer mouse based on a determination that the removeable internal power source is electrically coupled to the power management system and the external power source is not coupled to the interface. The removeable internal power source can be a removable charge storage device, and the removeable internal power source can be determined to be electrically coupled to the power management system when the removeable internal power source has a voltage supply level above a threshold value. In some implementations, the external power source is a charging mouse pad configured to wirelessly provide power to the power management system via electromagnetic induction when the computer mouse is placed on or near the charging mouse pad. In some aspects, the fixed internal power source is a supercapacitor configured to be charged by the external power source via a charging circuit. In certain implementations, the charging circuit includes a current limiter comprising: a first low-dropout voltage (LDO) regulator circuit that is biased in a floating output configuration; a second LDO regulator circuit configured to regulate its output voltage to a level that is within a normal operational range of the fixed internal power source, wherein the first LDO regulates its output voltage across an output resistor thereby generating a constant current that passes through the second LDO and charges the second internal power source until the second LDO reaches and regulates at a predetermined voltage, thereby causing the first LDO to stop regulating until the output of the second LDO drops below the predetermined voltage.

In some embodiments, an input device (e.g., computer mouse) can include one or more processors; a power interface circuit electrically and communicatively coupled to the one or more processors, the power interface circuit operable to electrically couple to and receive power from a plurality of different types of external power sources including at least: a first type of external wireless power source operable to wirelessly provide power to the computer mouse at a voltage and a first current; and a second type of external wireless power source operable to wirelessly provide power to the computer mouse at the voltage and a second current, the second current being at least twice a magnitude of the first current. The power interface circuit can be operable to generate and send type data to the one or more processors indicating whether the first type of external power source or the second type of external wireless power source is wirelessly and electrically coupled to the power interface circuit. In some aspects, the one or more processors configure the computer mouse to change power consumption characteristics based on whether the first type or second type of external wireless power source is wirelessly and electrically coupled to the power interface circuit. The computer mouse can further include a housing configured in the computer mouse that is electrically and communicatively coupled to the one or more processors. The power interface circuit includes a removable modular insert configured to physically and electrically couple to the housing of the computer mouse in a complementary fit relationship. The removable modular insert is configured to be non-destructively coupled to and removed from the housing, and is operable to generate and send the type data to the one or more processors. The removable modular insert can include one or more magnets operable to mechanically help couple and align the removable modular insert with the housing and the second type of external power source.

The power interface circuit can be operable to receive power from the first type of external wireless power source while the computer mouse is moving along an underlying surface, the underlying surface being at least a portion of the first type of external power source, and the power interface circuit is configured such that it only receives power from the second type of external wireless power source while the computer mouse is substantially stationary. The type data from the power interface circuit may be a binary sequence (e.g., digital or analog sequence) that corresponds to the type of external power source. In some embodiments, the type data from the power interface circuit is a 5V binary sequence operating between 2 kHz-10 kHz.

In certain embodiments, the power interface circuit includes a load switch operable to convert a received voltage (e.g., DC, rectified DC, AC, etc.) into a binary sequence that operates as the type data that indicates whether the first type of external wireless power source or the second type of external wireless power source is wirelessly and electrically coupled to the power interface circuit. In some aspects, the load switch is comprised of one or more field-effect transistors (FETs) configured to operate as a switch that receives a 5V input voltage from the external power source and cycles an output of the load switch in a train of on/off states forming the binary sequence that operates as the type data, and typically between 2 kHz-10 kHz, although other binary sequence frequencies are possible.

In certain embodiments, the power interface circuit is further operable to mechanically and electrically couple to and receive power from one or more wired power sources including at least a third type of external power source operable to provide to the computer mouse at the voltage and a third current, the third current being at least twice the magnitude of the first current. In some cases, the first type of external wireless power source is a wireless charging mat, the second type of external wireless power source is a wireless charging mount or stand, or the third type of external power source is a wired universal serial bus protocol. In some implementations, the first type of external wireless power source provides 5 VDC at a maximum of 40-60 mA, and/or the second type of external wireless power source provides 5 VDC at a maximum of 100-500 mA. The one or more processors may control charging characteristics based on whether the first type or second type of external wireless power source is wirelessly and electrically coupled to the power interface circuit, the charging characteristics including a rate of charge, wherein the computer mouse is operable to charge one or more internal power storage devices at a first charging rate when the first type of external wireless power source is coupled to the power interface circuit, and charge one or more internal power storage devices at a second charging rate when the second type of external wireless power source is coupled to the power interface circuit, the second charging rate being at least double the first charging rate.

In some embodiments, the computer mouse can include one or more visual output elements, wherein the one or more processors are configured to operate the one or more visual output elements in a first operating output configuration when the first type of external wireless power source is coupled to the power interface circuit, and the one or more processors are configured to operate the one or more visual output elements in a second operating output configuration when the second type of external wireless power source is coupled to the power interface circuit, the first and second operating output configurations being different from each other. In some cases, the computer mouse can include an optical sensor controlled by the one or more processors, the optical sensor configured to detect movement of the computer mouse relative to an underlying surface and generate corresponding movement data. The computer mouse is operable to communicatively couple to a host computing device and to periodically generate and send an operational report to the host computing device. The operational report may include the movement data. In some aspects, when the second type of external wireless power source is coupled to the power interface circuit, the one or more processors are configured to prevent the movement data from being included in the operational reports.

In certain embodiments, a method of operating a computer mouse can include: establishing, by one or more processors, an electrical and communicative coupling to a power interface circuit operable to wirelessly and electrically couple to and receive power from a plurality of different types of external power sources and provide the received power to the computer mouse; receiving, by the one or more processors, type data from the power interface circuit that indicates whether a first type of external wireless power source or a second type of external wireless power source is wirelessly and electrically coupled to the power interface circuit; determining, by the one or more processors, a type of external wireless power source coupled to the power interface circuit based on the type data; and configuring the computer mouse to change power consumption characteristics based on whether the first type or second type of external wireless power source is wirelessly and electrically coupled to the power interface circuit. The computer mouse can include a housing configured in the computer mouse that is electrically and communicatively coupled to the one or more processors, wherein the power interface circuit includes: a removable modular insert configured to physically and electrically couple to the housing of the computer mouse in a complementary fit relationship, wherein the removable modular insert is configured to be non-destructively coupled to and removed from the housing, and wherein the removable modular insert is configured to send the type data to the one or more processors. Configuring the computer mouse to change power consumption characteristics based on whether the first type or second type of external wireless power source is wirelessly and electrically coupled to the power interface circuit can further include: charging one or more internal power storage devices at a first charging rate when the first type of external wireless power source is determined to be coupled to the power interface circuit; and charging one or more internal power storage devices at a second charging rate when the second type of external wireless power source is determined to be coupled to the power interface circuit, the second charging rate being at least double the first charging rate. In some embodiments, the first type of external power source is a wireless charging mat, and/or the second type of external power source wireless charging mount or stand.

In further embodiments, a method of operating a modular insert for a computer mouse includes receiving power, by a modular insert, from an external power source, wherein the modular insert is a power interface circuit configured to physically and electrically coupled to a housing of the computer mouse, wherein the modular insert is configured to be non-destructively coupled to and removed from the housing; operating a load switch on the modular insert to convert a voltage of the received power into a binary sequence that characterizes a type of the external wireless power source including: a first type of external wireless power source; and a second type of external wireless power source; and sending the binary sequence to the computer mouse, the binary sequence configured to cause the computer mouse to change power consumption characteristics based on whether the binary sequence indicates that the first type or the second type of external wireless power source is wirelessly and electrically coupled to the power interface circuit. In some aspects, the load switch includes one or more field-effect transistors (FETs) configured to operate as a switch, wherein operating the load switch further includes cycling an output of the load switch that generates a train of on/off states forming the binary sequence. The binary sequence may operate between 2 kHz-10 kHz, although other frequencies are possible.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
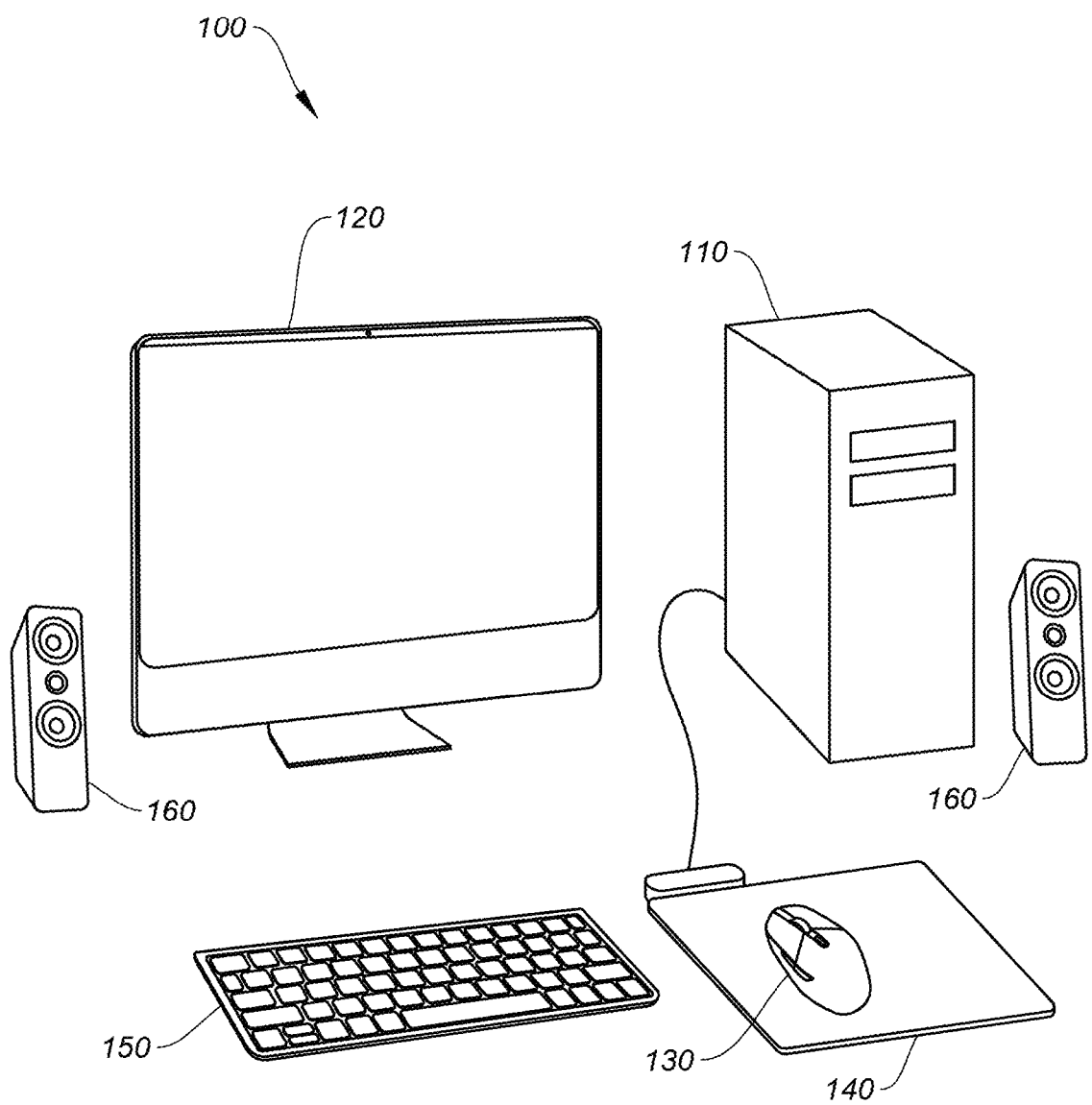
FIG. 1 shows an example of a computer system that can include any of a variety of host computing devices and computer peripheral devices, according to certain embodiments.

Aspects of the present disclosure relate generally to computer peripheral devices, and more particularly to a power management system for a computer mouse, according to certain embodiments.

In the following description, various examples of a power management system for managing multiple power sources for a computer input device are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to managing a plurality of power sources for an input device. More specifically, a novel computer mouse (or other suitable computer peripheral device) may be configured to be powered by a removable battery (e.g., AA cell(s)) or a wireless inductive power source (e.g., a powered charging mouse pad). A user may use the computer mouse with the removeable battery as a power source when the charging mouse pad is unavailable and can remove the removeable battery when operating the computer mouse on the charging mouse pad. Typically, fixed rechargeable batteries, which are often found in wireless computer mice, are heavy, costly, non-removable, and sometimes require extensive infrastructure (e.g., I/O ports and corresponding cable harnesses, PCBs, etc.) to support their use, which can add cost, internal real-estate, and considerable weight to the computer mouse, which can be an issue for competitive e-sports gamers. Thus, giving users an option to remove a battery when an alternative power source is available can give users a competitive weight advantage and provide options to the user in case they do not want to bring a charging pad for all of their mobile use. In some cases, the plurality of power sources can be configured on, or coupled to, a modular insert that can be electrically and mechanically coupled to and decoupled from the computer mouse. In some aspects, the modular insert can be received in a housing of the computer mouse in a complementary fit relationship that holds the modular insert in place, establishes the electrical and mechanical coupling thereto, and communicates with the computer mouse (e.g., the processor(s) 210, as described below). The modular insert can add functionality to the mouse, such as a wireless inductive charging capability, or additional charge storage (e.g., supercapacitor) to provide power during power lapses with the inductive charging system (e.g., dead spots on a powered mouse pad, periodic lifting of the mouse to reposition it (e.g., "skating"), tilting of the computer mouse, etc.). Alternatively or additionally, the charge storage device (e.g., supercapacitor) may be configured in the computer mouse rather than the modular insert. In some aspects, the modular insert can include a charging circuit that can be operable to keep the supercapacitor ("supercap") satisfactorily charged while receiving and managing a limited wireless power source to ensure that the computer mouse circuitry is adequately powered for proper operation.

Figure 4:
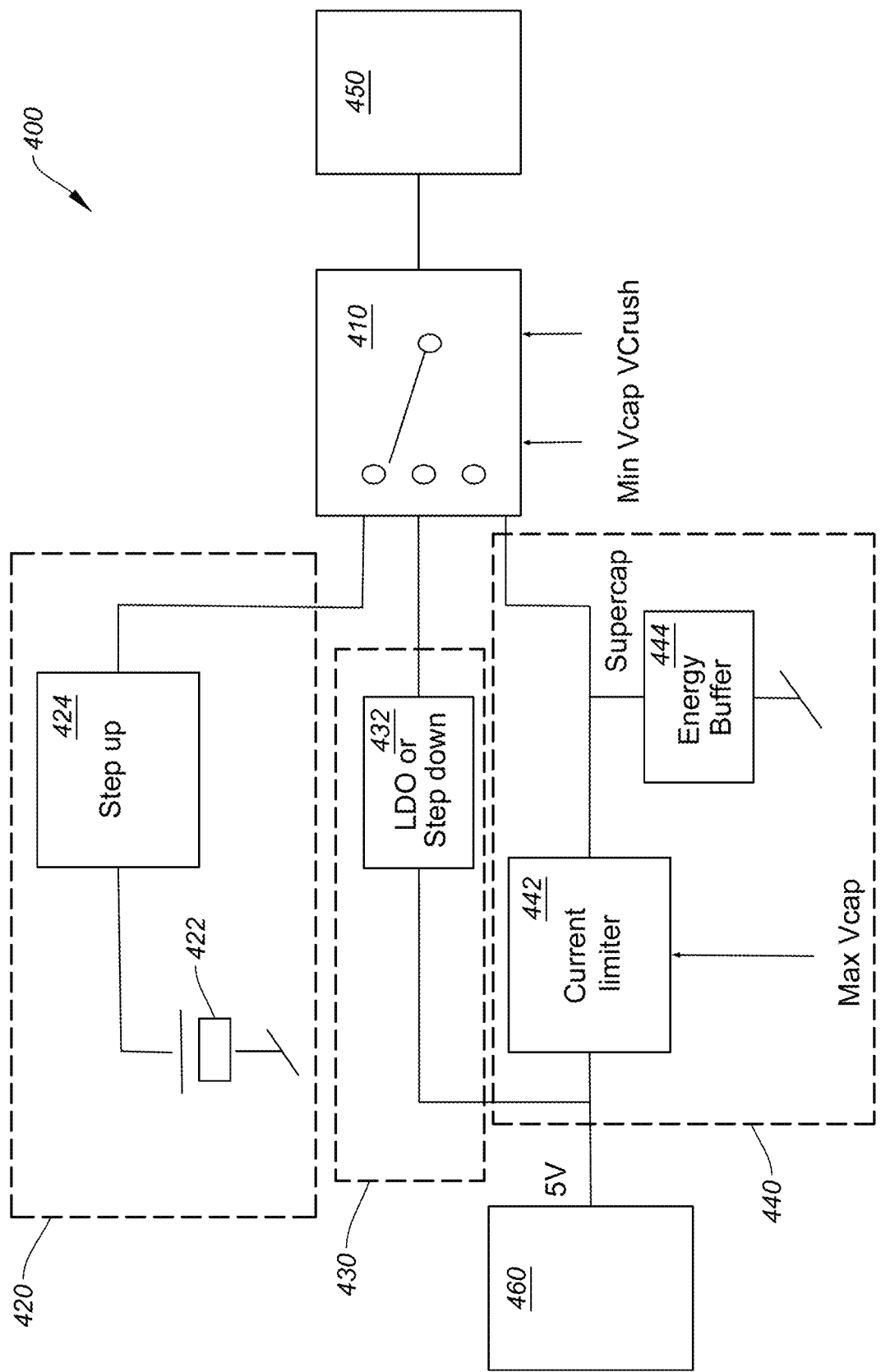
FIG. 4 shows a simplified block diagram of a power management system for an input device with multi-power sources, according to certain embodiments.

A multiplexor ("MUX") can be used to switch between available power sources (e.g., battery, external inductive charging source, supercap, etc.) to ensure an uninterrupted flow of power to the computer mouse to keep it operating with sufficient power. The MUX may have any suitable hierarchy of power selection. In some embodiments, the MUX may select the removable battery(ies) over the wireless power source by default when the battery(ies) are available. In some embodiments, the MUX may select wirelessly received power when the removable battery voltage falls below a threshold value (or is removed). In some embodiments, wireless power is prioritized and utilized regardless of whether a removable battery is detected in the system, which can extend the life of the charge for the removable battery if it is present. In some implementations, the MUX can be "self-powered" such that it can draw power from any of the selected sources of power (e.g., wired or wireless power sources) and does not require a separate or dedicated power supply to operate. Any configuration of a MUX selection hierarchy is possible, as would be appreciated by one of ordinary skill in the art with the benefit of this disclosure. Some embodiments of a system to manage multiple power sources for a computer input device may be configured with a similar architecture as shown in FIGS. 4 and 6, as further described, for instance, in the various paragraphs of the present specification that follow.

By way of example, certain devices, systems, and methods can be configured to perform operations including: determining whether a first internal power source (e.g., removeable charge storage device) is electrically coupled to a power management system in the computer mouse; selecting the first internal power source to power the computer mouse based on a determination that the first internal power source is electrically coupled to the power management system (e.g., voltage supply is at or above a threshold value);

determining whether an external wireless power source (e.g., charging mouse pad providing wireless power via electromagnetic induction when the mouse is one or near the charging mouse pad) is coupled to the power management system; selecting the external wireless power source to power the computer mouse based on a determination that the external wireless power source is electrically coupled to the power management system and the first internal power source is not coupled to the power management system; determining whether a second internal power source (e.g., charge storage device, such as a supercapacitor, charged via a charging circuit) is coupled to the power management system; and selecting a second internal power source to power the computer mouse based on a determination that the first internal power source and the external wireless power source are not coupled to the power management system. Some implementations use a charging circuit comprised of low dropout regulators (LDOs) configured with a novel circuit design to include current limiting the received wireless power to ensure that the supercapacitor is charged and that the computer mouse internal electronics are continuously and adequately powered. In some implementations, the system may rely on priorities of each power source to make a selection and other input status, such as voltage thresholds, may be used to determine if any input provides a valid voltage and, if so, the system selects the power source regardless of power sources having lower priority. An example of the charging circuit can be seen in FIGS. 6 and 7, as further described, for instance, in the various paragraphs of the present specification that follow.

Further aspects of the embodiments described below are directed to systems and methods for harvesting power from multiple types sources of power including external power sources (e.g., wirelessly received power) and internal power sources (e.g., internal battery). In some conventional designs, accessing wireless power is possible, but typically only one protocol. For example, some designs have an interface that lets a user hang their input device on a charging cradle or place their input device on charging pad or platform to enable wireless charging of the input device while the input device is stationary on the charging device. Other designs have an interface that lets a user charge the input device while moving along a powered surface, such as a wireless charging mat. Aspects of the invention allow a same input device to be charged by any type of wireless power source, be it a wireless charging mat (e.g., operating at 6.78 MHz), a charging cradle, a charging pad, or the like, by way of a power interface circuit (see, e.g., FIG. 7-8) that allows power harvesting from any suitable type of wireless power transfer protocol, to make for a flexible input device configured to be powered by a wide array of different types of wireless and wired power sources. Heretofore, this has not been possible as many technologies employed had dedicated technologies configured for a single wireless charging protocol.

In some embodiments, a power interface circuit can be operable to couple power or control the coupling of power from an external power source (e.g., power source using inductive power coupling) to an input device (e.g., computer mouse). In some embodiments, the power interface circuit can be a non-destructively removable modular insert (e.g., it can be installed and removed repeatedly in a modular fashion) that can be configured to operate with one or more different wireless power transfer protocols. For example, some embodiments may be configured to operate over several different wireless charging protocols, including wireless charging protocols that charge while an input device is in motion (e.g., a charging mousepad) at a relatively low charge rate at the receiving input device (e.g., 50 mA), or those that only charge while the input device is stationary on a charging implementation (e.g., cradle, mat) at a typically higher charge rate (e.g., <500 mA). Some modular inserts may be configured to accommodate multiple wireless charging protocols. In some embodiments, a number of different modular inserts can be used where each modular insert is configured to operate according to a different wireless charging protocol. For example, a first modular insert can be inserted into the input device to operate according to a first wireless charging protocol that allows charging while the input device is in use (e.g., moving along a powered mouse pad), and the second modular insert can be inserted into the input device to operate according to a second wireless charging protocol that allows charging while the input device is not in use (e.g., the input device is stationary). Thus, a user can interchangeably swap out different modular inserts to accommodate different wireless charging protocols. The removable modular insert can be configured to physically and electrically couple to a housing of an input device in a complementary fit relationship, as shown for example in FIG. 8, that operates as an interface to receive power from an external wireless power source (e.g., inductive power received by a receiving coil on the modular insert) and deliver the received power to the input device. The modular insert can be communicatively coupled to the external wireless power source and/or the input device (e.g., aspects of system 200). The removable modular insert can be coin shaped, as shown in the various figures presented herein, or in any suitable shape including round, polygonal, planar, non-planar, or other suitable shape with any suitable footprint. The power interface circuit (e.g., the modular insert) can be controlled by aspects of system 200 (e.g., processors 210), by aspects of a host computing device (e.g., processor(s) 302), and/or can have on-board processing for controlling power receiving and power transfer characteristics, as described herein. The various embodiments described expressly and tacitly described herein show how a coin-implementation of a power interface circuit configured as a modular insert can enable wireless charging of an input device over different wireless charging protocols. One of ordinary skill in the art with the benefit of this disclosure would appreciate the many modifications, variations, and alternative embodiments thereof. It should be noted that a removable modular insert is one type of power interface circuit, and implementations other than a removable modular insert can be used, such as a fixed power interface circuit, or other implementation as would be appreciated by one of ordinary skill in the art with the benefit of this disclosure.

FIG. 1 shows an example of a computer system 100 that can include any of a variety of host computing devices and computer peripheral devices, including computer peripheral devices (e.g., a computer mouse, etc.) that can be configured to perform aspects of the various inventive concepts described herein. Computer system 100 includes a host computing device 110 (shown as a desktop computer) and a number of computer peripheral devices communicatively coupled to the host computing device, including a display device 120, a computer mouse 130, a powered/charging mouse pad 140, a keyboard 150, speakers 160, and may include any other suitable peripheral devices (e.g., a printer, headset, Wi-Fi hub, etc.), as would be appreciated by one of ordinary skill in the art with the benefit of this disclosure.

Host computing device 110 is shown as a desktop computer, however other types of host computing devices can be used including laptop computers, gaming systems, set top boxes, entertainment systems, tablet or "phablet" computers, stand-alone head mounted displays ("TMID"), or any other suitable host computing device (e.g., smart phone, smart wearable device, or the like). In some cases, multiple host computing devices may be used and one or more of the computer peripheral devices may be communicatively coupled to one, some, or all of the host computing devices (e.g., a computer mouse may be coupled to multiple host computing devices and may switch between them using Flow™ technology from Logitech®). A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) to control aspects of the host computing device and/or the computer peripheral devices (e.g., control video on display device 120, control aspects of the operation of computer mouse 130, keyboard 150, etc.).

A typical computer peripheral device can include any suitable input device, output device or input/output device including those shown (e.g., a computer mouse) and not shown (e.g., remote control, wearables (e.g., gloves, watch, head mounted display), AR/VR controller, CAD controller, joystick, simulation shifter, stylus device, or other suitable device) that can be used, for example, to convert analog inputs into digital signals for computer processing. By way of example, a keyboard may be configured to provide control signals including button click events (e.g., corresponding to a pressing of one or more keys on the keyboard), audio signals (e.g., audio cues, integrated speakers), visual output signals (e.g., controlling one or more LEDs on keyboard 150—controlled by the keyboard, the host computing devices coupled thereto, or a combination thereof), or the like. In another example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

Computer mouse 130 may include the novel charging implementations described herein including the concepts described at least in FIGS. 4-12 and elsewhere in the present disclosure. For example, computer mouse 130 may include the charging circuits of FIGS. 6 and 7 or elements thereof, in fixed (e.g., hardwired to the computer mouse) or removable architecture arrangements (e.g., removable modular insert), as further described, for instance, in the various paragraphs of the present specification that follow.

An input device may be a computer peripheral device, and may be referred to as either herein, as well as a "peripheral input device," "peripheral," or the like. In some cases, input devices may be referred to as human interface devices (HIDs) and their corresponding control signals may be referred to as HID commands. As noted above, the majority of the embodiments described herein generally refer to computer mouse 130; however, it should be understood that a computer peripheral device can be any suitable input/output (I/O) device (e.g., user interface device, control device, input unit, or the like) that may be adapted to utilize the novel embodiments described and contemplated herein.

Typical System Embodiment for Operating an Input Device

Figure 2:
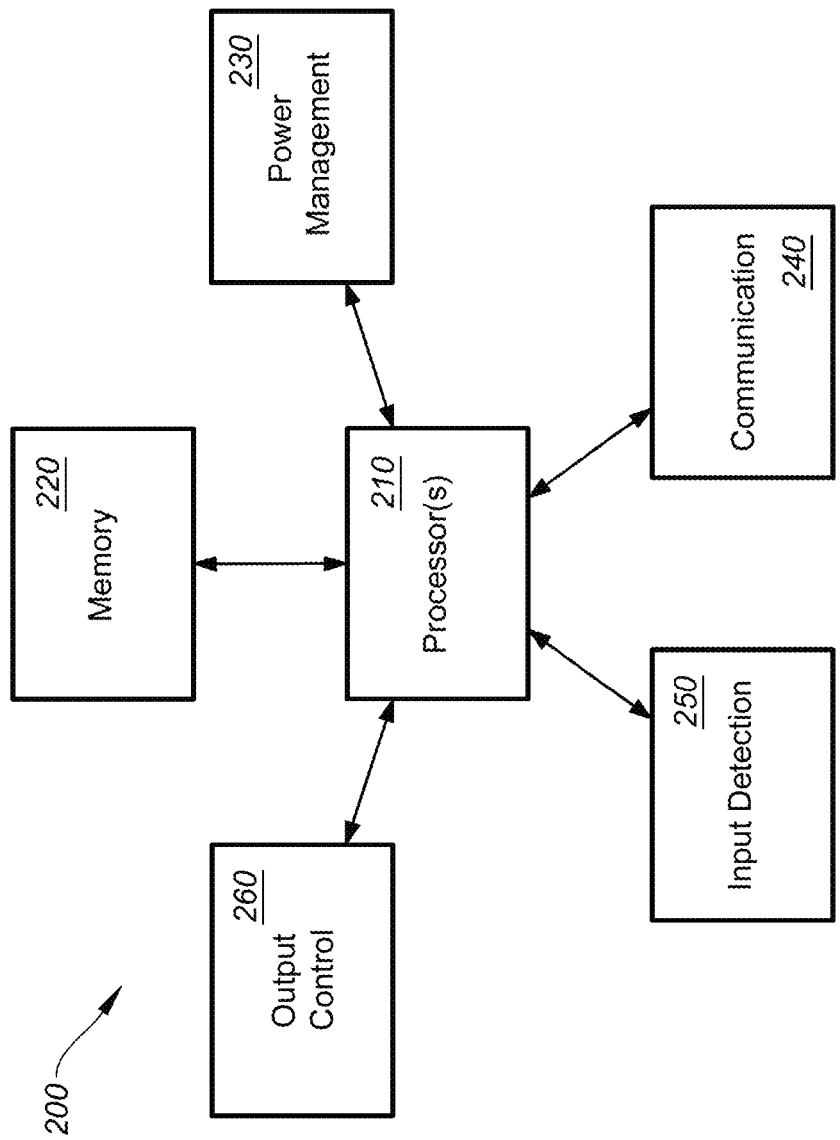
FIG. 2 shows a system for operating a computer peripheral device, according to certain embodiments.

FIG. 2 shows a system 200 for operating a computer peripheral device (e.g., computer mouse 130, keyboard 150, etc.), according to certain embodiments. System 200 may be configured to operate any of the computer peripheral devices specifically shown or not shown herein but within the wide purview of applicable input devices of the present disclosure. System 200 may include processor(s) 210, memory block 220, a power management block 230, a communication block 240, an input detection block 250, and an output control block 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 (also referred to as "modules," "systems," or "subsystems") may be implemented as separate blocks, or alternatively, multiple system blocks may be implemented in a single block. In the context described herein, system 200 can be incorporated into any input device described or mentioned herein and may be further configured with any of the novel embodiments described below (e.g., FIGS. 4-12), as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 140 (e.g., system blocks 220-260). Alternatively or additionally, some of system blocks 220-260 may include an additional dedicated processor, which may work in conjunction with processor(s) 210. For instance, MCUs, pCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth); however, multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device by a sensor (e.g., optical sensor, accelerometer, etc.), activation of one or more input elements (e.g., buttons, sliders, touch-sensitive regions, etc.), or the like. Stored data may be aggregated and sent via reports to a host computing device (e.g., HID data).

In certain embodiments, memory 220 can store the various data described throughout this disclosure. For example, memory 220 can store and/or include instructions configured to control managing multiple power sources for a computer input device, as described herein, at least with respect to FIGS. 4-12. Memory 220 can be referred to as a storage system or storage sub-system and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing, by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., LED lighting characteristics, functions, etc.) as described herein.

Power management block 230 can be configured to manage power distribution, recharging, power efficiency, and more germane to the novel concepts presented throughout the specification, to managing multiple power sources for a computer input device. In some embodiments, the functions provided by power management block 230 may be incorporated into processor(s) 210. Some embodiments may not include a dedicated power management block. Alternatively or additionally, some embodiments may incorporate aspects of power management infrastructure on a removable modular insert, as further described below. In some embodiments, functional aspects of power management block 230 may be subsumed by another block (e.g., processor(s) 210) or in combination therewith. In some implementations, power management block 230 may include aspects of the power management system described further below with respect to FIGS. 4-12.

Communication block 240 can be configured to enable wireless communication with a corresponding host computing device (e.g., 110), or other devices and/or peripherals, according to certain embodiments. Communication block 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, input device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some cases, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some embodiments, the reports can be generated by the processor(s) only, in conjunction with the processor(s), or other entity in system 200. Communication block 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection module 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection module 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes can be used to detect a movement of computer peripheral device 150 relative to an underlying surface. Computer peripheral device 130 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking block (which may include an additional dedicated processor), or a combination thereof, may perform movement tracking functions, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 130. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
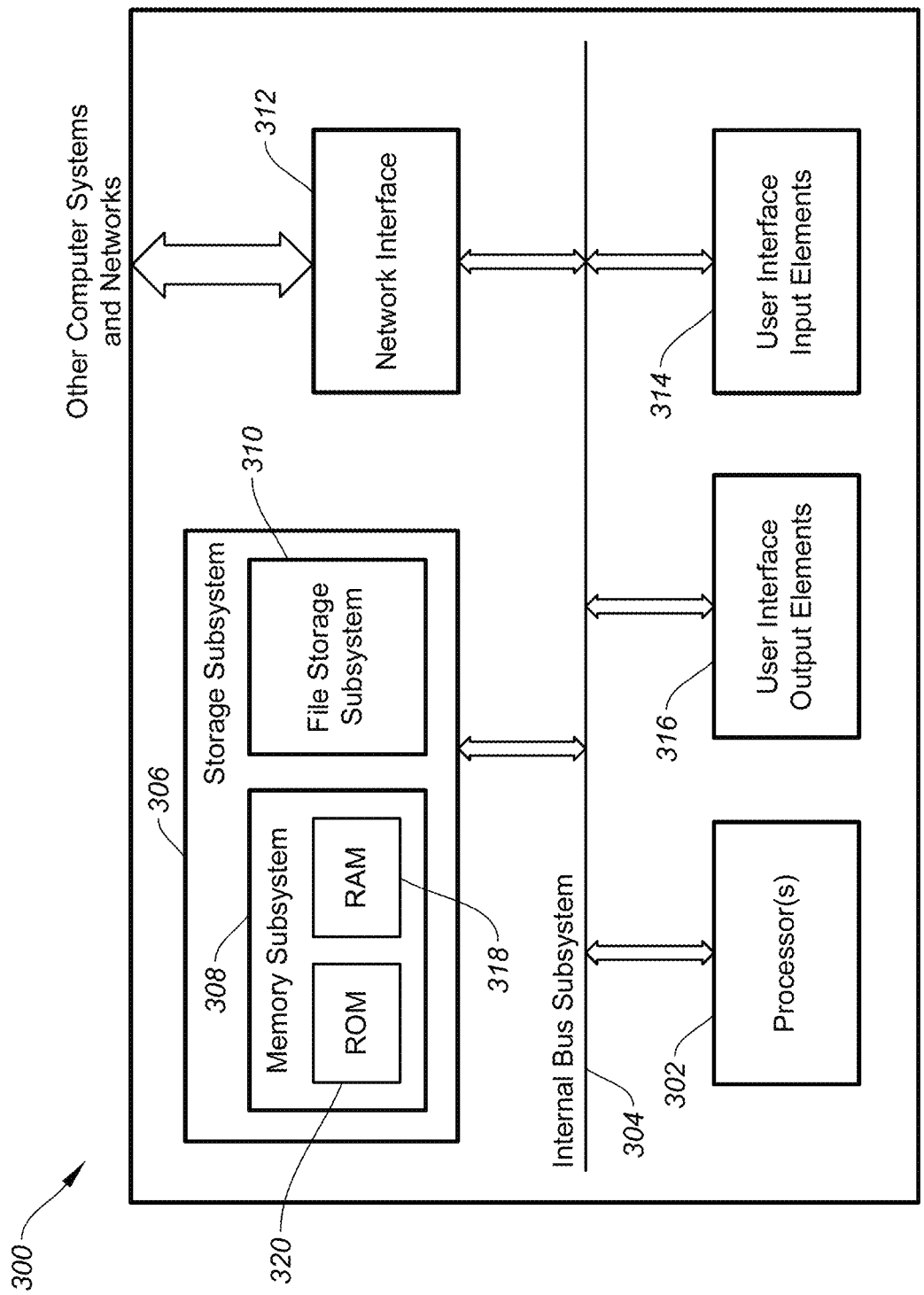
FIG. 3 is a simplified block diagram of a computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop 110 or laptop computer, mobile device (e.g., tablet computer, smart phone, mobile phone), wearable device, media device, or the like, in peripheral devices (e.g., keyboards, etc.) in certain implementations. Computing device 300 can also be referred to as "computing system 300" or "system 300" throughout the present disclosure.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed-up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

The term "storage medium" or "storage device" may represent one or more memories for storing data, including read-only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of input device 140, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that direct a processor of a computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse 130, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of computing device 300 as an integrated system. In some cases, such as in laptop computers, this may be the case as keyboards and input elements as well as a display and output elements are integrated on the same host computing device. In some cases, the input and output devices may be separate from computing device 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Power Management System for Managing Multiple Power Sources

In some embodiments, a computer peripheral device, such as a computer mouse, may be configured to be powered by multiple different power sources. For instance, the multiple power sources can include a removable battery (e.g., AA cell(s)) or a wireless inductive power source (e.g., a powered charging mouse pad). By way of a non-limiting example, a user may use the computer mouse with the removeable battery as a power source when the charging mouse pad is unavailable and can remove the removeable battery when operating the computer mouse on the charging mouse pad. Typically, fixed rechargeable batteries, which are often found in wireless computer mice, can be costly, non-removable, and sometimes require extensive infrastructure (e.g., I/O ports and corresponding cable harnesses, PCBs, etc.) to support their use, which can add cost, internal real-estate, and considerable weight to the computer mouse, which can be an issue for competitive e-sports gamers. Thus, giving users an option to remove a battery when an alternative power source is available can give users a competitive weight advantage and provide options to the user if they do not want to bring a charging pad for all of their mobile use.

In some cases, the plurality of power sources can be configured on, or coupled to, a modular insert that can be electrically and mechanically coupled to and decoupled from the computer mouse. In some aspects, the modular insert can be received in a housing of the computer mouse in a complementary fit relationship that holds the modular insert in place, establishes the electrical and mechanical coupling thereto, and communicates with the computer mouse (e.g., the processor(s) 210, as described below). The modular insert can add functionality to the mouse, such as a wireless inductive charging capability, or additional charge storage (e.g., supercapacitor) to provide power during power lapses with the inductive charging system (e.g., dead spots on a powered mouse pad, periodic lifting of the mouse to reposition it (e.g., "skating"), tilting of the computer mouse, etc.). An example of a modular insert can be found in U.S. Pat. No. 10,622,824, which is herein incorporated by reference in its entirety for all purposes. While the embodiments described herein are different than the embodiments described in U.S. Pat. No. 10,622,824, it is to be understood that said embodiments (e.g., see FIGS. 4-12) could be configured on a similar modular insert or variant thereof and mechanically/electrically coupled to a corresponding input device, as described therein. Further examples of a removable modular insert and embodiments thereof that can work in conjunction with an input device and external power source include at least the embodiments of FIGS. 7-12.

The modular insert (also referred to as a "coin") can include a charging circuit that can be operable to keep a charge storage element (also referred to as an "energy buffer"), such as a supercapacitor ("supercap") satisfactorily charged while receiving and managing a limited wireless power source to ensure that the computer mouse circuitry is adequately powered for proper operation. The charge storage element may be configured in the computer mouse, or in some cases may be on the modular insert. In some implementations, the modular insert may interface with a wireless power source and deliver wireless power to the computer mouse when installed (e.g., 5 V at 50 mA), and the current control charging circuit and charge storage element (e.g., supercap) may be in the computer mouse rather than on the modular insert. These features can be configured on the modular insert, the computer mouse, or a combination thereof. A multiplexor ("MUX") can be used to switch between available power sources (e.g., battery, external inductive charging source, supercap, etc.) to ensure an uninterrupted flow of power to the computer mouse (e.g., supporting circuitry) to keep it operating with sufficient power. The MUX may have any suitable hierarchy of power selection. In some embodiments, the MUX may select the wireless power source(s) over the removable batteries by default. In some aspects, the MUX may select the removable battery(ies) over the wireless power source by default when the battery(ies) are available. In some embodiments, the MUX may select wirelessly received power when the removable battery voltage falls below a threshold value (or is removed). In some aspects, the MUX may be configured to prioritize the bypass (further described below), followed by power from the charge storage element for the wireless power source (e.g., supercap), followed by the wired power source (e.g., removable battery). Any configuration of a MUX selection hierarchy is possible, as would be appreciated by one of ordinary skill in the art with the benefit of this disclosure. Some embodiments of a system to manage multiple power sources for a computer input device may be configured with a similar architecture as shown in FIGS. 4 and 6, as further described, for instance, in the various paragraphs of the present specification that follow.

Thus, certain preferred embodiments include input devices (e.g., computer mouse) that can operate with and without a removable battery (e.g., alkaline-type); can provide power to supporting electronics (e.g., when switching between power supplies) in a sufficiently fast timeframe (e.g., <100 s or faster to avoid any MCU reset)—typically using a bypass architecture, as described below; supporting electronics may be configured to not exceed 50 mA (e.g., total current draw on bypass branch and supercap branches), and supporting electronics may consume >30 mA (e.g., total current draw on bypass and supercap branches) when charging the supercap, and when below 30 mA (or other suitable threshold value), the system may switch to End of Charge (EoC) mode where supercap 444 is charged to a threshold value (e.g., 90-100% or other value/range).

FIG. 4 shows a simplified block diagram of a power management system 400 for an input device with multi-power sources, according to certain embodiments. Power management system ("PM System") 400 can include a multiplexor (MUX) 410 and three branches electrically coupled to its input including a battery branch 420, a bypass branch 430, and a supercap branch 440. MUX 410 can switch between each branch to electrically couple the selected branch to the supporting electronics 450 for the input device. Supporting electronics 450 can include system 200 or portions thereof, as would be appreciated by one of ordinary skill in the art with the benefit of this disclosure. MUX 410 can include fewer or more inputs. In some aspects, additional branches can be coupled to MUX 410. Some or all of system 400 can be subsumed by system 200. For example, system 400 may be a part of power management block 230.

Battery branch 420 can include a battery 422 and a voltage step up circuit 424, according to certain embodiments. Battery 422 can include one or more alkaline-type cells, but other battery/cell types can be used (e.g., Li—FeS$_2$, Li-ion, NiCd, etc.). The form factor for battery 422 is typically AA or AAA cell type, but other form factors are possible. One useful aspect of the present invention is that it can operate without a dedicated rechargeable battery, which requires additional support circuitry (e.g., charging ports, additional charge busses, etc.) that adds considerable weight and utilizes more space inside the computer mouse. Replaceable cells are typically lighter, have a smaller form factor, and with respect to the present invention, can be removed from the input device with the input device still being operational due to power provided by the other branches 430, 440, which can provide a competitive advantage in gaming scenarios. Voltage step-up circuit ("Voltage step up") 424 is typically series-coupled downstream from battery 422 and upstream from MUX 410 (as shown in FIG. 4), although it can be configured before or after MUX 410. In some aspects, voltage step up 424 may be a DC-to-DC voltage step up device that can increase the battery 422 output voltage. In some embodiments, the one or more cells of battery 422 typically ranges from 0.9 V-1.65 V. Voltage step-up 424 may be configured to boost the voltage of battery 422 from to 2V, although other voltage settings can be used, as would be appreciated by one of ordinary skill in the art with the benefit of this disclosure. In certain embodiments, the battery branch may use a single PMOS transistor to be disconnected (deselected) by the MUX. This can put some constraints on the operating voltage for each branch, e.g., the voltage from the battery branch is typically the lowest voltage to prevent the single PMOS from conducting due to residual voltage drops. Some implementations may utilize a dual PMOS topology to avoid this, as would be appreciated by one of ordinary skill in the art with the benefit of this disclosure. Referring back to FIG. 4, when battery 422 is removed, the voltage on battery branch 420 may drop to 0 V, which can be detected by system 400 to prompt MUX 410 to switch to another power source. The battery can be referred to herein as a "removeable" or "first" internal power source.

Bypass branch 430 can be configured to receive power from an external power source 460. For instance, bypass branch 430 may receive power from a wireless inductive power coupling device. In some embodiments, the wireless power coupling device can be a charging mat (e.g., Logitech® Power Play® device) that can be used as both a mouse pad and as a source of wireless power that can inductively couple energy from the mouse pad to a device on or near the mouse pad (e.g., a mouse) that can then convert the inductively coupled energy into electrical power to power the input device. Wireless power can be inductively coupled from the wireless power coupling device to the input device while the input device is stationary or in motion on or along a surface of the wireless power coupling device. In some cases, wireless power can be coupled to the input device when the input device is a small distance away from the wireless power coupling device (e.g., computer mouse <2 cm from the mouse pad).

Bypass branch 430 may include a voltage step down device 432 that can be configured to reduce the input voltage from the external power source to 3.3 V, or other suitable value, that can be provided to supporting electronics 450 via MUX 410, as would be appreciated by one of ordinary skill in the art with the benefit of this disclosure. In some aspects, voltage step down device 432 may be a low voltage dropout regulator ("LDO").

In certain embodiments, bypass branch 430 has priority over the other power sources (e.g., battery branch 420 and supercap branch 440) and can be operable to ensure that supporting electronics 450 has a reliable source of power for proper operation. In some cases, bypass branch 430 can provide a higher voltage than battery branch 420 to ensure proper operation of MUX 410. In some embodiments, current flowing through bypass branch 430 may not be controlled and can be variable as it is operable to current feed supporting electronics 450 (e.g., MCU, sensor, system 200 or portions thereof), which may change depending on a current usage of the computer mouse (e.g., sleep mode, active mode, etc.). The LDO or stepdown 432 may or may not have a clamp feature and although shown in FIG. 4 is not necessary for the operation of system 400. In some aspects, a function of the LDO is to reduce the voltage feeding the MUX so it does not exceed an operating voltage of the other electronics in the system (200). As such, the voltage is typically reduced to 3.6 V or less with an LDO or step down circuit. As noted above, the supercap can be any suitable energy storage element (energy buffer), which can also include a rechargeable battery or the like. One of ordinary skill in the art with the benefit of this disclosure would appreciate the many modifications, variations, and alternative embodiments thereof.

Supercap branch 440 can be coupled to an external power source. In some aspects, the external power source can be the same external power source 460 that is coupled to bypass branch 430, as shown in FIG. 4, such as a wireless inductive power coupling device. Supercap branch 440 can include a current limiter 442 and a charge storage device 444. In the examples that follow, the charge storage device is described as one or more supercapacitors ("supercap") although those of ordinary skill in the art will understand that other charge storage devices can alternatively or additionally used. In some aspects, supercap 444 can be 0.2 F-0.4 F, which may depend on whether a voltage step up is used. Smaller or larger supercaps (e.g., 1-2 F), or combinations thereof, can be used, as would be appreciated by one of ordinary skill in the art with the benefit of this disclosure. The supercap is more generally referred to as a "fixed" internal power source, charge storage device, and/or an energy buffer.

Current limiter 442 can include multiple stages including a first stage with a floating LDO with a resistive load, a second stage with an LDO that is operable to protect the charge storage device against an overvoltage condition, and a third stage operable to prevent the charge storage device from leaking into the second stage. In the first stage, the floating LDO with the resistive load may include a low voltage drop (e.g., 1 V) to increase a valid input voltage range and surface coverage (e.g., area of powered mouse pad with EM emission in relation to total pad area). To provide more context, powered mouse pads may emit an electromagnetic (EM) field over its surface with power being capture by a receiver (e.g., modular insert). The EM field is typically not homogeneous over the entire mouse pad surface and there are some locations with less available power, and in some cases it too low for the receiver to operate properly, which can be referred to as power transmission holes. In some aspects, by reducing the operating voltage of the receiver, power transmission holes can be reduced. Thus, reducing operating headroom for currently limitation can help (e.g., 1 V, 0.7 V, or other suitable voltage), as would be appreciated by one of ordinary skill in the art with the benefit of this disclosure. Referring back to FIG. 4, in certain implementations, the 1 V applied to the load resistor may limit the current in the overall supercap branch 440 and typically with high precision (e.g., 1% voltage regulation, 1% resistor), which can help system 400 maintain a 30 mA/50 mA specification, by reducing the design margin, as further described below. The LDO may or may not have any clamp feature.

The second stage can include an LDO configured to protect the charge storage device 444 against an overvoltage condition. In the second stage, the LDO typically does not have any clamp. In embodiments where charge storage device 444 is a supercap, a typical LDO operates at 2.7 V or 3 V, although other voltages are possible, as would be appreciated by one of ordinary skill in the art with the benefit of this disclosure. Higher voltages can increase the exploitable voltage range of the supercap, which may extend its operation time. For example, in some embodiments, to provide a valid voltage, the supercap branch should provide at least 2 V, so if the supercap technology limits the branch to 2.7 V, a range of 2.0-2.7 V can used for a certain capacity for a given operation time (energy quantity). If a 3 V supercap is used, the operating range can increase to 2.0-3.0 V, thus there is approximately 40% more exploitable energy for a given capacity, yielding a longer operating time. On the other hand, reducing the supercap capacity may not have as long an operating time, but the supercap will typically have a smaller footprint, which may be a factor in compact designs. One of ordinary skill in the art with the benefit of this disclosure would appreciate the many modifications, variations, and alternative embodiments thereof.

The third stage can be configured to prevent supercap 444 from leaking into the second stage, however some embodiments may operate without the third stage, as would be appreciated by one of ordinary skill in the art with the benefit of this disclosure.

In some embodiments, an example of a typical operation of system 400 can include the following conditions: at startup, supercap voltage is at near 0 V; once 5 V is received at the input of supercap stage 440 (e.g., received from a wireless inductive voltage source, such as a charging mouse pad), current limiter 442 can be active (e.g., 35 mA draw) and the protection LDO (e.g., second stage) may typically see an insufficient voltage (the $2^{nd}$ LDO may not have sufficient Vin to regulate). At this point, supercap 444 voltage may slowly increase until the protection LDO (e.g., from the second stage) reaches its output voltage (e.g., 2.7 V). At this point, the current may then decrease until it is detected by system 400 as an EoC condition, at which case current limiter 442 may not be regulating.

Referring back to the first stage, certain embodiments are configured such that the floating LDO regulates 1 V across an output resistor to achieve a known, constant current, while the second "protection" LDO protects the supercap by preventing the voltage across it from exceeding 2.7 V. Thus, both the floating LDO and protection LDO operate in a manner that is fundamentally different from their conventional operational configurations, which typically just cap and regulate a voltage. For example, when the charge on supercap 444 is low (e.g., <1 V), a 5V input with a 1 V drop on R2 may cause the protection LDO to operate in a non-conventional manner by not regulating the voltage and allowing current to pass through until supercap 444 reaches a sufficient charge (e.g., 2.7 V), wherein the protection LDO then regulates the voltage on supercap 444, the current stops flowing through the protection LDO such that the current on R2 drops and the first LDO no longer regulates. Note that floating LDO operates unconventionally by operating as a current limiter in a floating configuration, which is an atypical architectural configuration. Similarly unique is the protection LDO operating as a current passthrough until it begins regulating the output voltage on supercap 444 to prevent an overvoltage condition. The combination of the floating and protection LDOs are configured such that when current is not passing, the voltage at resistor R2 increases until equilibrium between the two LDOs, as would be appreciated by one of ordinary skill in the art with the benefit of this disclosure.

Figure 5:
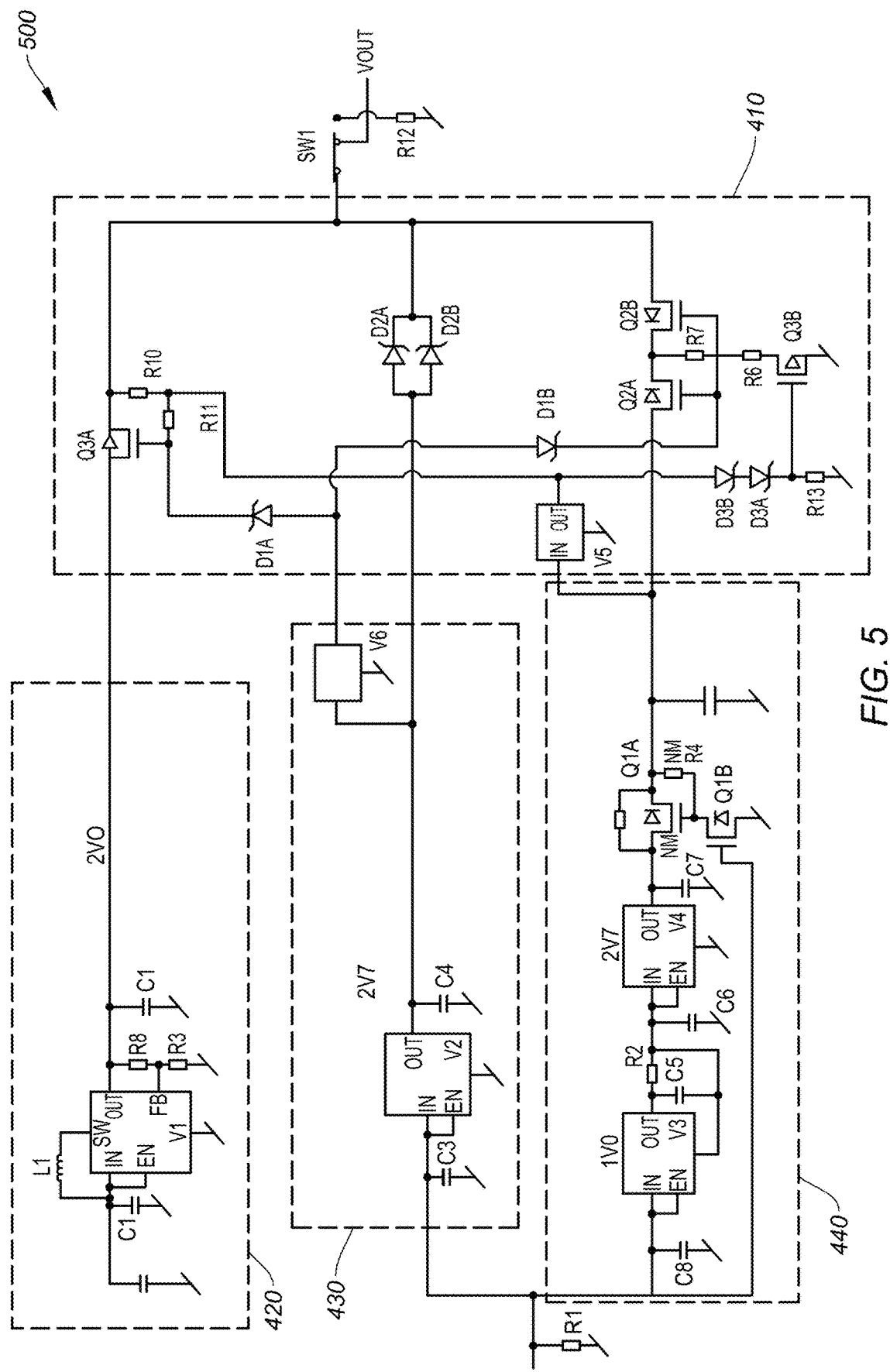
FIG. 5 shows a circuit block diagram of the power management system, according to certain embodiments.

FIG. 5 shows a circuit block diagram ("system") 500 of the power management system, according to certain embodiments. In some implementations, system 500 can be a more detailed, circuit-diagram level representation of system 400, or portions thereof. The following operational details are intended to provide insight as to the functional operation of system 400/500 in certain circumstances, but should not be interpreted as the only method of operation for system 400/500, as would be appreciated by one of ordinary skill in the art with the benefit of this disclosure.

In some cases, though not necessary in all embodiments, battery branch 420 may provide the lowest voltage, which can help increase battery life, and may operate at approximately 2 V, although other operational voltages can be used. When external power is detected (e.g., wireless power is received by system 500, such as by a modular insert configured to receive inductive power from a powered mouse pad), bypass branch 430 is selected by MUX 410 and provides power to supporting electronics 450. In some embodiments, bypass branch 430 may source up to 3.6 V, although alternative embodiments may have higher or lower maximum voltages for supplying supporting electronics 450. Higher voltages may operate to reduce current consumption. In some aspects, a 2.5 V detector with push-pull output (U6) can facilitate smoother transitions (e.g., less abrupt) between MUX switching (e.g., MOS threshold). In some embodiments, a higher voltages can help ensure that PMOS transistors are more reliably controlled. In some aspects, as soon as the voltage from the bypass branch is high enough (e.g., 2 V plus diode biasing voltage), the bypass can be selected and the supercap can begin charging.

In certain embodiments, when bypass branch 430 provides the voltage via MUX 410 to supporting electronics 450, MUX 410 may force (e.g., through a voltage detector U6) Q2 and Q3A off, thereby disabling battery branch 420 and supercap branch 440. Considering that bypass branch 430 typically provides a higher voltage than battery branch 420, there is typically no leakage even when battery 422 is removed.

When system 400/500 enters EoC state with supercap 444 being fully charged (e.g., 2.7 V) and the 2 V push-pull voltage represents a logic high (1), the logic high will cause Q3A to turn off, Q2 to turn on, and power will be switched by MUX 410 to be sourced from supercap 444. Resistors R11 and R6 can be used when the voltage across supercap 444 ("Vsupercap") drops below 2 V (or other suitable threshold) to switch power back to bypass branch 430 (e.g., power source switches from supercap 444 to the external voltage source 460). In cases where the computer mouse is removed from the external power source (e.g., powered mouse pad), supporting electronics 450 may continue to be powered by supercap 444 until Vsupercap drops below its threshold voltage (e.g., 2 V). At which case, the voltage detector may assert a logic low (e.g., 0 V), Q3 may be turned on causing battery branch 420 to source power to supporting electronics 450 via MUX 410, and Q2 may be turned off to prevent continued charging of supercap 444 by the battery. A voltage step up circuit may be used to increase Vsupercap, however some embodiments of system 400/500 may not use a voltage step up circuit in supercap branch 440.

To summarize aspects of supercap branch 440, current limiter 442 limits the current from the wireless power input (e.g., powered mouse pad 460) to charge the super capacitor and can prevent the supercapacitor from discharging back (e.g., reverse current) to the wireless power input (e.g., through a coil in the modular insert). Supercap 444 can be configured to charge from external power source 460 (powered mouse pad) and provide power for a limited time when the mouse is lifted from the powered mouse pad, during the time taken for the powered mouse pad to turn on after the mouse is placed on it, for example, or when the powered mouse pad is in end of charge mode. The bypass branch 430 allows the externally sourced power to bypass the current limiter and supercap (supercap branch 440), making power immediately available to supporting circuitry 450 without having to wait for supercap 440 to charge, which can ensure proper input device (e.g., computer mouse) operation regardless of the charge state of supercap 440 or battery 422. A supercap step up voltage circuit, while not required, may operate to extend the range of a usable Vsupercap voltage from 2 V to 1 V. Thus, a lower capacitance can be chosen, and the time from arrival on the powered mousepad to operation from the supercap can be faster. As described above, system 400/500 is configured to run from the supercap and wireless power alone—without an AA cell. When supercap 444 is charged, the powered mouse pad may enter End of Charge (EoC) mode. To restart power emission, a current check needs to run, which can be scheduled any suitable interval (e.g., every In any case, the computer mouse should start working fast (less than a few seconds) when placed on the powered mouse pad, so that the user does not have to wait for the supercap to charge up, which is made possible via bypass branch 430.

In some embodiments, the priority for power sources may be (1) bypass branch 430, (2) supercap branch 440, and (3) battery branch 420. This prioritization may allow use of supercap 444 from approximately 2.7-3 V down to approximately 2 V (e.g., can be any suitable voltage range for the system electronics, and typically 2.0-3.6 V, although other ranges are possible). To help reduce the size of supercap 444, a 3.3 V step up can be used downstream from supercap 444, which may extend the operating range down to 1V, thus increasing operational dynamics. When Vsupercap is sufficiently low (e.g., close to 0 V), voltage detector U5 output may follow Vsupercap and switch Q3B on, potentially causing leakage from battery branch 420 to supercap branch 440 and D3 can ensure that U5 is in its operating voltage range before Q3B can be activated. Typically, to extend battery life for the removeable battery, the voltage may be set relatively low, but high enough to power the system electronics (e.g., system 200). To provide a non-limiting and specific example of operating parameters for a typical system 400/500, step up voltage can be 1.9 V+/−0.1V, bypass LDO may operate at 2.82 V, and supercap branch 440 current can be 31.1 mA for Vsupercap 0-2.776 V, 22.5 mA up to 2.781 V, 13 mA up to 2.786 V, 6 mA up to 2.792V, and 0.1 mA up to 2.802 V. It should be understood that these are measurements for a particular system and the measurements may vary 5-10% or more, as would be appreciated by one of ordinary skill in the art with the benefit of this disclosure.

In some cases, wireless charge via inductive coupling may be relatively inefficient. A typical wireless power emission of a powered mouse pad or other external wireless power source may be approximately 500 mA, which may be limited by wireless emission standards. Charge transfer may be 10-15% efficient, which may result in approximately 50 mA total power transfer. Thus, in some embodiments, system 400/500 should operate to coordinate a best case power budget of at least a 15 mA for bypass branch 430 and 30 mA-35 mA to charge supercap 444 in supercap branch 440. In some exemplary embodiments, system 400/500 should be configured to draw at least 30 mA at all times, which can be used to inform the external power source that charge is needed so it continues to emit power. By way of example, current draw of 15 mA or less typically signals to the external power source that power is not needed; current draw above 25 mA (30 mA for more certainty) indicates that power is needed, and current draw between the two may be interpreted either way and can result in non-continuous power or shutdown all together. As such, 30 mA minimum constant draw (for bypass and supercap branches combined) may ensure that the external power source continuously provides power. In scenarios where supercap 440 is not full (e.g., it is charging) and the computer mouse is moving, 30-40 mA may be drawn for charging supercap 440 and 10-20 mA may be allocated to bypass branch 430 to ensure that supporting electronics 450 is sufficiently and continuously powered. When the computer mouse is not moving, 30 mA is drawn to charge supercap 440, which is enough to ensure that the external power source continues to continuously provide wireless power. In some embodiments, when supercap 440 is sufficiently charged (e.g., 90% charged, 100% charged, etc.), the external power source may no longer provide wireless power until supercap 444 requires charging. Alternatively, some embodiments may request power from the external power source even when supercap 440 is fully charged.

Figure 6A:
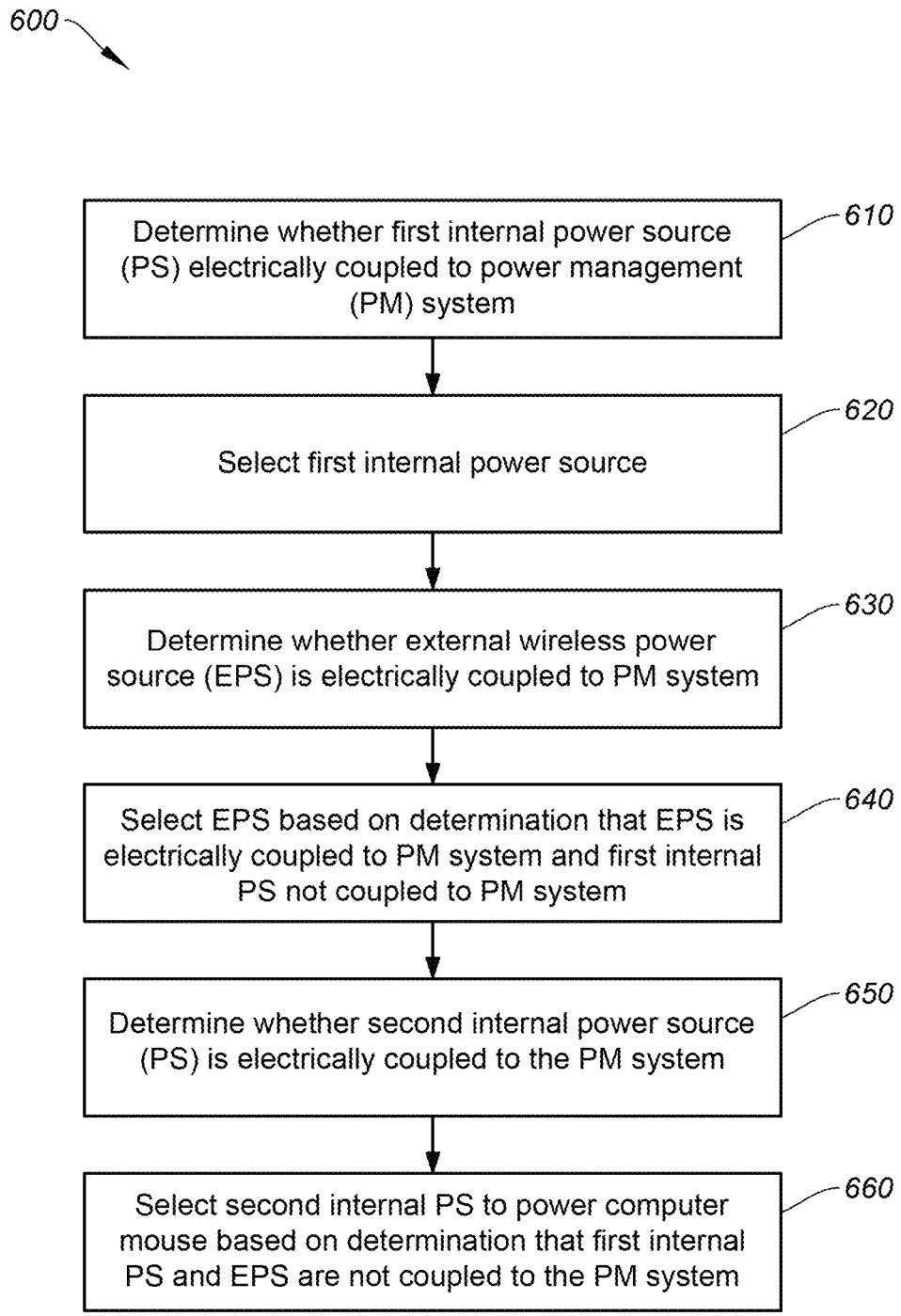
FIG. 6A is a simplified flow chart showing aspects of a method for operating a power management system, according to certain embodiments.

FIG. 6A is a simplified flow chart showing aspects of a method 600 for operating a power management system, according to certain embodiments. Method 600 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 600 can be performed by aspects of system 400, system 500, system 200 (which may include systems 400/500), or a combination thereof.

At operation 610, method 600 can include determining whether a first internal power source is electrically coupled to a power management system in the computer mouse, according to certain embodiments. The first internal power source may be a removable charge storage device (e.g., an alkaline or rechargeable cell). In some aspects, the first internal power source may be determined to be electrically coupled to the power management system when the first internal power source has a voltage supply level above a threshold value. For example, system 400/500 may interpret a 1.5 V cell that is operating at 1 V to be "not electrically coupled" to MUX 410 to ensure that a depleted battery is not used as a power source to power supporting electronics 450.

At operation 620, method 600 can include selecting the first internal power source to power the computer mouse based on a determination that the first internal power source is electrically coupled to the power management system, according to certain embodiments.

At operation 630, method 600 can include determining whether an external wireless power source is coupled to the power management system, according to certain embodiments.

At operation 640, method 600 can include selecting the external wireless power source to power the computer mouse based on a determination that the external wireless power source is electrically coupled to the power management system and the first internal power source is not coupled to the power management system, according to certain embodiments. In some aspects, the external power source may be a charging mouse pad configured to wirelessly provide power to the power management system via electromagnetic induction when the computer mouse is placed on or near the charging mouse pad. A coil and supporting electronics to receive the wireless power in the computer mouse may be fixedly integrated in the computer mouse or may be housed on a modular insert (e.g., "coin," as described above) that can be mechanically and electrically coupled to and removed from the computer mouse.

At operation 650, method 600 can include determining whether a second internal power source is coupled to the power management system, according to certain embodiments.

At operation 660, method 600 can include selecting a second internal power source to power the computer mouse based on a determination that the first internal power source and the external wireless power source are not coupled to the power management system, according to certain embodiments. In some implementations, the second internal power source is a charge storage device (e.g., supercapacitor(s)) configured to be charged by the external power source via a charging circuit. The charging circuit can include a current limiter comprising a first low-dropout voltage (LDO) regulator circuit that is biased in a floating output configuration and a second LDO regulator circuit configured to regulate its output voltage to a level that is within a normal operational range of the second internal power source. The first LDO can be operable to regulate its output voltage across an output resistor thereby generating a constant current that passes through the second LDO and charges the second internal power source until the second LDO reaches and regulates at a predetermined voltage, thereby causing the first LDO to stop regulating until the output of the second LDO drops below the predetermined voltage. In some embodiments, a total allowed current supplied by the external power source is between 40-60 mA, where the external power source is configured to simultaneously provide power to the power management system and charge the second internal power source without exceeding the total allowed current.

It should be appreciated that the specific steps illustrated in FIG. 6A provide a particular method 600 for operating a power management system, according to certain embodiments. Other sequences of steps may also be performed according to alternative embodiments. For instance, some embodiments described herein default to the internal power source (e.g., battery) when detected, with the external power source as a secondary alternative. Some embodiments may alternatively prioritize the external power source over the internal power source. For instance, the wireless power supply and bypass branch may have first priority, the second internal power supply (e.g., supercap) may have second priority, and the first internal power supply (e.g., removeable battery) may have third priority. One of ordinary skill in the art with the benefit of this disclosure would appreciate the many modifications, variations, and alternative embodiments thereof. Furthermore, additional steps may be added or removed depending on the particular application. Any combination of changes can be used and one of ordinary skill in the art with the benefit of this disclosure would understand the many variations, modifications, and alternative embodiments thereof.

Figure 6B:
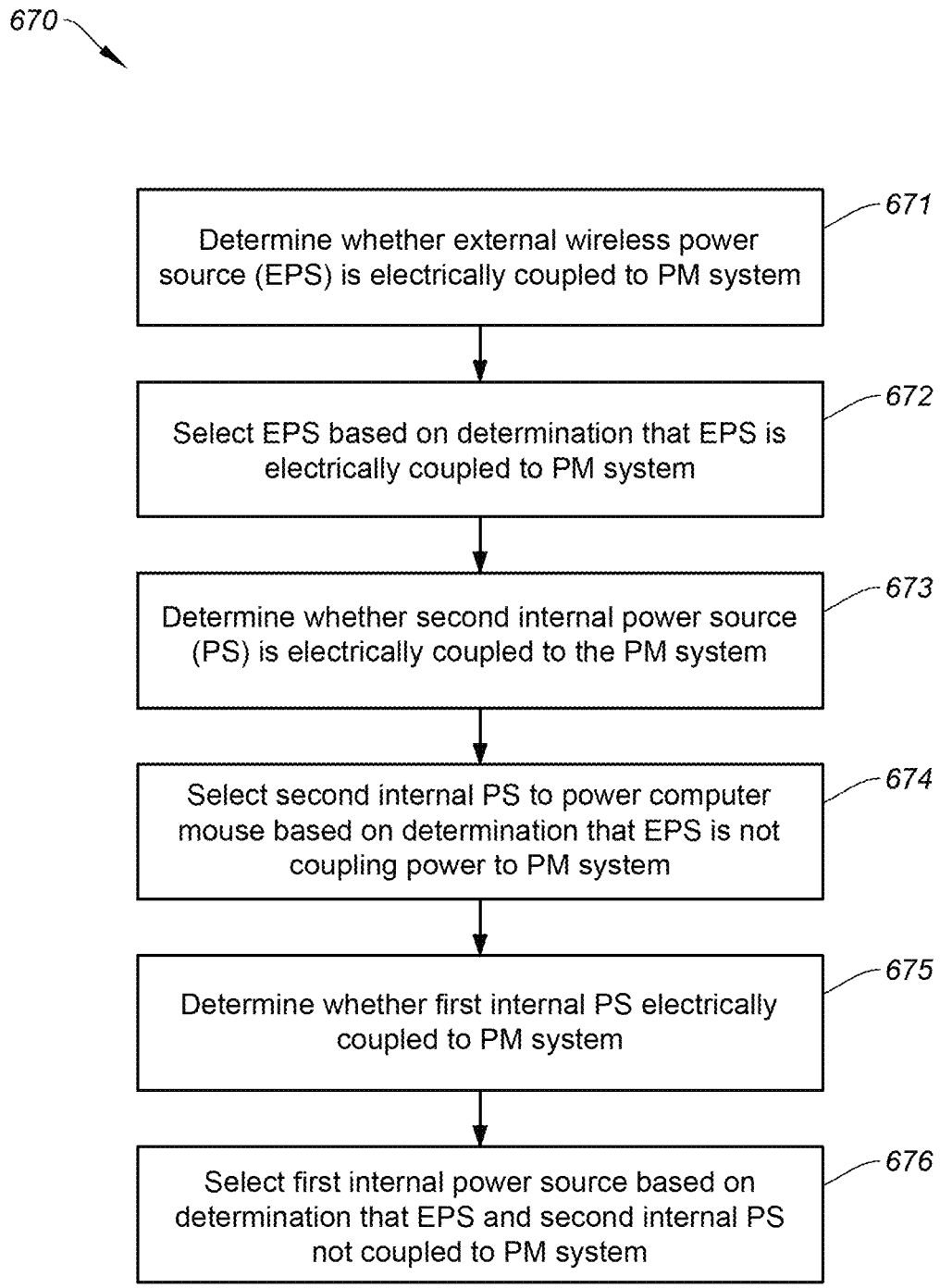
FIG. 6B is a simplified flow chart showing aspects of another method for operating a power management system, according to certain embodiments.

FIG. 6B is a simplified flow chart showing aspects of a method 670 for operating a power management system, according to certain embodiments. Method 670 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 670 can be performed by aspects of system 400, system 500, system 200 (which may include systems 400/500), or a combination thereof.

At operation 671, method 670 can include determining whether an external wireless power source is coupled to an interface (e.g., modular insert) configured to transfer power from the external wireless power source to the power management system, according to certain embodiments.

At operation 672, method 600 can include selecting the external wireless power source to power the computer mouse based on a determination that the external wireless power source is electrically coupled to and providing power to the power management system, according to certain embodiments. In some aspects, the external power source may be a charging mouse pad configured to wirelessly provide power to the power management system via electromagnetic induction when the computer mouse is placed on or near the charging mouse pad. A coil and supporting electronics to receive the wireless power in the computer mouse may be fixedly integrated in the computer mouse or may be housed on a modular insert (e.g., "coin," as described above) that can be mechanically and electrically coupled to and removed from the computer mouse.

At operation 673, method 670 can include determining whether a fixed internal power source (e.g., a supercap) is coupled to the power management system, according to certain embodiments.

At operation 674, method 670 can include selecting the fixed internal power source to power the computer mouse based on a determination that the fixed internal power source is coupled to the power management system and the external wireless power source is coupled to but not providing enough power to the interface (e.g., when the user is skating, or there are lower power holes or areas on the powered mouse pad), which is coupled to the power management system, according to certain embodiments. In some implementations, the fixed internal power source is a charge storage device (e.g., supercapacitor(s)) configured to be charged by the external power source via a charging circuit. The charging circuit can include a current limiter comprising a first low-dropout voltage (LDO) regulator circuit that is biased in a floating output configuration and a second LDO regulator circuit configured to regulate its output voltage to a level that is within a normal operational range of the fixed internal power source. The first LDO can be operable to regulate its output voltage across an output resistor thereby generating a constant current that passes through the second LDO and charges the fixed internal power source until the second LDO reaches and regulates at a predetermined voltage, thereby causing the first LDO to stop regulating until the output of the second LDO drops below the predetermined voltage. In some embodiments, a total allowed current supplied by the external power source is between 40-60 mA, where the external power source is configured to simultaneously provide power to the power management system and charge the fixed internal power source without exceeding the total allowed current.

At operation 675, method 670 can include determining whether a removeable internal power source is electrically coupled to the power management system in the computer mouse, according to certain embodiments. The removeable internal power source may be a removable charge storage device (e.g., an alkaline or rechargeable cell). In some aspects, the removeable internal power source may be determined to be electrically coupled to the power management system when the first internal power source has a voltage supply level above a threshold value. For example, system 400/500 may interpret a 1.5 V cell that is operating at 1 V to be "not electrically coupled" to MUX 410 to ensure that a depleted battery is not used as a power source to power supporting electronics 450.

At operation 676, method 670 can include selecting the first internal power source to power the computer mouse based on a determination that the removeable internal power source is electrically coupled to the power management system, the external wireless power source is not coupled to the power management system and/or the fixed internal power source is not coupled to the power management system, which may include not being physically coupled or not having a sufficient charge to power the system (200), according to certain embodiments. As such, the hierarchy of the system prioritizes the external power source (bypass branch), followed by the fixed internal power source (e.g., supercap), and finally the removeable internal power source (e.g., rechargeable battery). This prioritization may extend the life of the charge of the rechargeable battery. Any suitable hierarchy can be used and these inputs can be prioritized in any order, as would be appreciated by one of ordinary skill in the art with the benefit of this disclosure.

It should be appreciated that the specific steps illustrated in FIG. 6B provide a particular method 670 for operating a power management system, according to certain embodiments. Other sequences of steps may also be performed according to alternative embodiments. For instance, some embodiments described herein default to the internal power source (e.g., battery) when detected, with the external power source as a secondary alternative. One of ordinary skill in the art with the benefit of this disclosure would appreciate the many modifications, variations, and alternative embodiments thereof. Furthermore, additional steps may be added or removed depending on the particular application. Any combination of changes can be used and one of ordinary skill in the art with the benefit of this disclosure would understand the many variations, modifications, and alternative embodiments thereof.

Power Interface for Sourcing Multiple Types of External Wireless Power for an Input Device Aspects of the embodiments described above are directed to systems and methods for harvesting power from multiple different types of power sources including external power sources (e.g., wirelessly received power) and internal power sources (e.g., internal battery). In some conventional designs, accessing wireless power is possible, but typically only one protocol. For example, some designs have an interface that lets a user hang their input device on a charging cradle or place their input device on charging pad or platform to enable wireless charging of the input device while the input device is stationary on the charging device. Other designs have an interface that lets a user charge the input device while moving along a powered surface, such as a wireless charging mat. Aspects of the invention allow a same input device to be charged by any type of wireless power source, be it a wireless charging mat (e.g., operating at 6.78 MHz), a charging cradle, a charging pad, or the like, by way of a power interface circuit (see, e.g., FIG. 7-8) that allows power harvesting from any suitable type of wireless power transfer protocol, to make for a flexible input device configured to be powered by a wide array of different types of wireless and wired power sources. Heretofore, this has not been possible as many technologies employed had dedicated technologies configured for a single wireless charging protocol.

In some embodiments, a power interface circuit can be operable to couple power or control the coupling of power from an external power source (e.g., power source using inductive power coupling) to an input device (e.g., computer mouse). In some embodiments, the power interface circuit can be a non-destructively removable modular insert (e.g., it can be installed and removed repeatedly in a modular fashion) that can be configured to operate with one or more different wireless power transfer protocols. For example, some embodiments may be configured to operate over several different wireless charging protocols, including wireless charging protocols that charge while an input device is in motion (e.g., a charging mousepad) at a relatively low charge rate at the receiving input device (e.g., ~50 mA), or those that only charge while the input device is stationary on a charging implementation (e.g., cradle, mat) at a typically higher charge rate (e.g., ~500 mA). Some modular inserts may be configured to accommodate multiple wireless charging protocols. In some embodiments, a number of different modular inserts can be used where each modular insert is configured to operate according to a different wireless charging protocol. For example, a first modular insert can be inserted into the input device to operate according to a first wireless charging protocol that allows charging while the input device is in use (e.g., moving along a powered mouse pad), and the second modular insert can be inserted into the input device to operate according to a second wireless charging protocol that allows charging while the input device is not in use (e.g., the input device is stationary). Thus, a user can interchangeably swap out different modular inserts to accommodate different wireless charging protocols. The removable modular insert can be configured to physically and electrically couple to a housing of an input device in a complementary fit relationship, as shown for example in FIG. 8, that operates as an interface to receive power from an external wireless power source (e.g., inductive power received by a receival coil on the modular insert) and deliver the received power to the input device. The modular insert can be communicatively coupled to the external wireless power source and/or the input device (e.g., aspects of system 200). The removable modular insert can be coin shaped, as shown in the various figures presented herein, or in any suitable shape including round, polygonal, planar, non-planar, or other suitable shape with any suitable footprint. The power interface circuit (e.g., the modular insert) can be controlled by aspects of system 200 (e.g., processors 210), by aspects of a host computing device (e.g., processor(s) 302), and/or can have on-board processing for controlling power receiving and power transfer characteristics, as described herein. The various embodiments described expressly and tacitly described herein show how a coin-implementation of a power interface circuit configured as a modular insert can enable wireless charging of an input device over different wireless charging protocols. One of ordinary skill in the art with the benefit of this disclosure would appreciate the many modifications, variations, and alternative embodiments thereof. It should be noted that a removable modular insert is one type of power interface circuit, and implementations other than a removable modular insert can be used, such as a fixed power interface circuit, or other implementation as would be appreciated by one of ordinary skill in the art with the benefit of this disclosure.

Thus, put simply for the purpose of a non-limiting conceptual illustration, some embodiments may include a computer mouse with a receptacle (e.g., slot, cavity, etc.) configured to accept a power interface circuit embodied on a removable modular insert (e.g., shaped like a coin), which can output a voltage across its terminals (e.g., magnets 822) when wirelessly coupled to an external power source (e.g., powered mouse pad. In some cases, by default the computer mouse charging circuitry (see, e.g., FIG. 5) may limit the current it will accept to 50 mA. This will provide a very slow rate of charge, enough to charge the computer mouse over longer periods while the computer mouse is used on the powered mousepad, which constantly powers the computer mouse, but not at the rate of a conventional charging solution (e.g., stationary charging cradle). The computer mouse can accept substantially more than 50 mA of current (e.g., >250 mA) when the power interface circuit announces itself by pulsing a specific ID pattern (e.g., type data), as described below at least with respect to FIG. 10. Thus, different type data can cause the mouse to charge at different rates based on the type of external power source. Other operational characteristics can be changed based on type data, including output elements (e.g., LEDs, audio cues, etc.) to alert the user that the computer mouse is charging and at what rate (e.g., slow charging while the computer mouse is in use, fast charging while the computer mouse is stationary).

Figure 7:
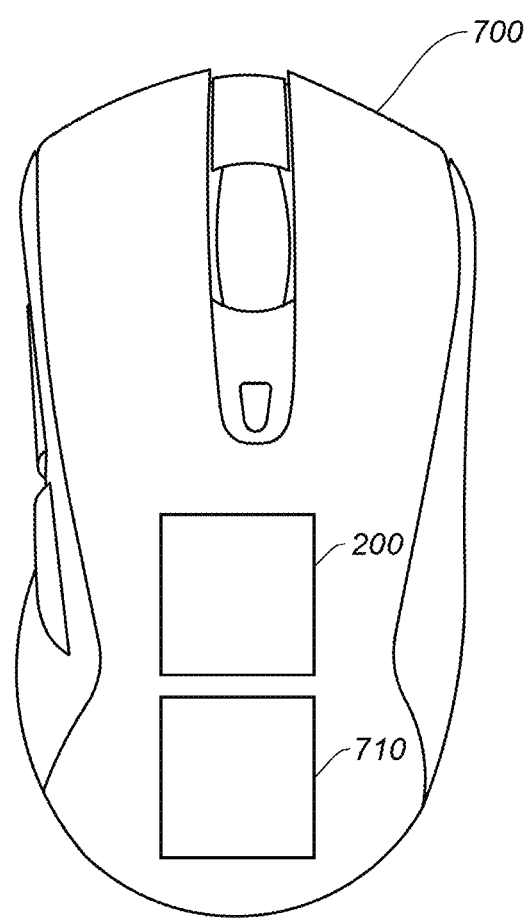
FIG. 7 shows a simplified diagram of a computer mouse with various systems operable to perform aspects of certain embodiments described herein.

FIG. 7 shows a simplified diagram of a computer mouse 700 with various systems operable to perform aspects of certain embodiments described herein. Computer mouse 700 can include system 200 to perform the various aspects of external wireless power source interfacing (e.g., power management block 230) described herein, such as with a dedicated (e.g., fixed) infrastructure. In some aspects, a power interface circuit 710 such as a removable modular insert can be used to interface with external wireless power sources (see, e.g., FIGS. 8-9). In some aspects, system 200, system 710, and/or system 300 can work in combination to perform the various aspects of wireless power transfer described herein (see, e.g., FIGS. 11-12). One of ordinary skill in the art with the benefit of this disclosure would appreciate the many modifications, variations, and alternative embodiments thereof.

Figure 8:
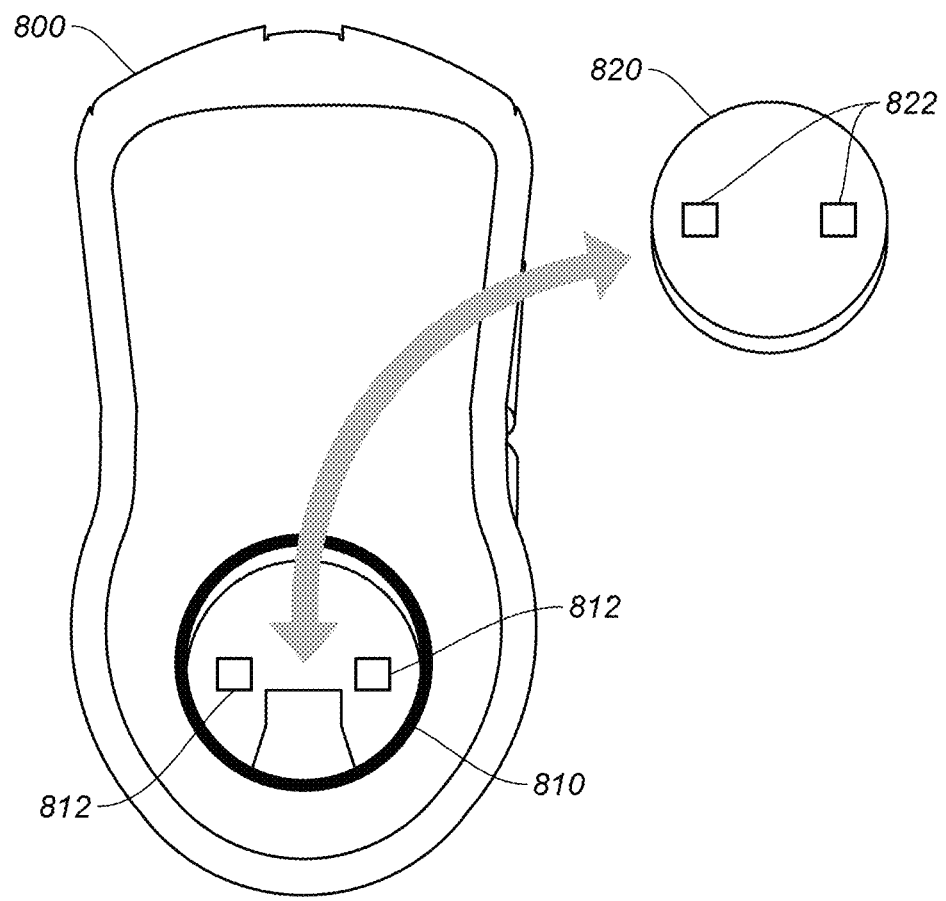
FIG. 8 shows a computer mouse with a housing configured to receive a removable modular insert, according to certain embodiments.

FIG. 8 shows a computer mouse 800 with a housing 810 configured to receive a removable modular insert 820 (e.g., power interface circuit), according to certain embodiments. Removeable modular insert 820 can be non-destructively inserted and remove from the housing 810 in a complementary fit relationship or in any manner that mechanically and electrically couples the removeable modular insert 820 to the computer mouse 800.

Removeable modular insert 820 can couple to housing 810 via friction fit, hardware (e.g., screws, tabs, clips, etc.), magnet(s), or other method of physically coupling and securing removeable modular insert 820 to housing 810 of computer mouse 800. Housing 810 can be any suitable receptable configured to couple to and secure the removable modular insert 820. In some embodiments, magnets 822 are configured on removable modular insert 820 and can operate to physically secure removable modular insert 820 to housing 810. Housing 810 can also include magnet(s) 812 to magnetically couple to magnets 822 on removable modular insert 820. The magnetic attraction between the two sets of magnets may also be configured to help orient and properly align removable modular insert 820 with housing 810. Magnets 812, 822 can be comprised of a conductive metal such that magnets 822 can be operable to conduct electricity. For example, magnets 822 may facilitate the transfer of wireless power received by the removeable modular insert 820 to the computer mouse 800, as would be appreciated by one of ordinary skill in the art with the benefit of this disclosure. It should be noted that although a number of different embodiments are described herein, any of the various input devices (computer mouse 130, 700, 800, etc.) can be configured to apply any of the novel embodiments described herein (e.g., see FIGS. 4-12), as would be appreciated by one of ordinary skill in the art with the benefit of this disclosure.

Figure 9:
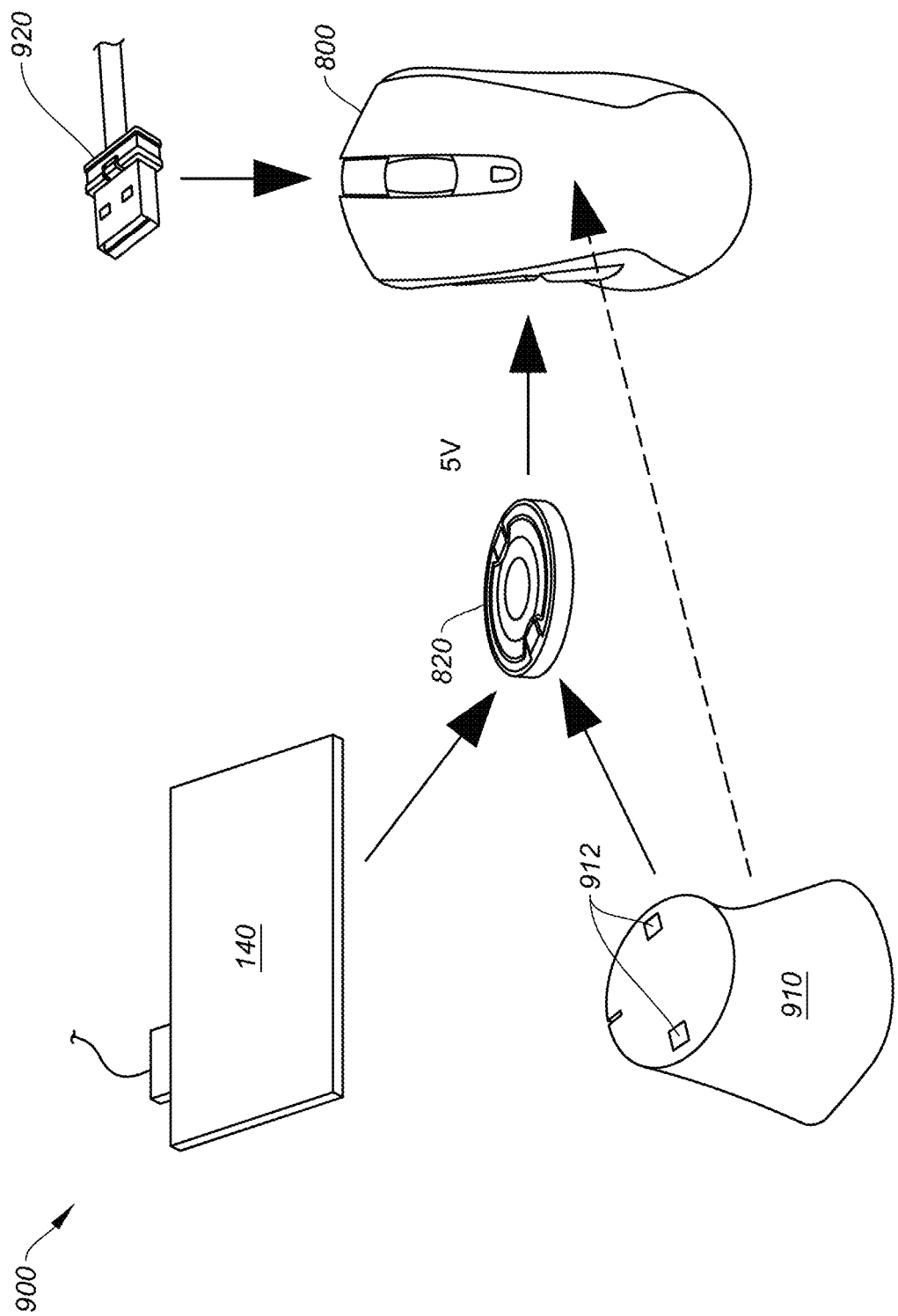
FIG. 9 is a simplified diagram showing a number of external power sources that can be configured to be electrically coupled to a removable modular insert, according to certain embodiments.

FIG. 9 is a simplified diagram 900 showing a number of various external power sources that can be configured to be electrically coupled to a removable modular insert 820, according to certain embodiments. Some external wireless power sources can include a powered mouse pad 140, a charging cradle, mat, or mount 910, or the like. In some embodiments, hardwired implementations (e.g., USB 920) may be electrically coupled to removable modular insert 820 or directly to housing 810 (e.g., via a power or I/O port) to provide externally sourced power. Powered mouse pad 140 may wirelessly couple power to computer mouse 800 via removable modular insert 820 while computer mouse 800 is moving along a surface of powered mouse pad 140. Mount 910 may wirelessly couple power to computer mouse 800 via removable modular insert 820 or directly to housing 810 while computer mouse 800 is stationary (e.g., fixed) on mount 910. For example, magnets 822 on removable modular insert 820 may mechanically and electrically couple to magnets 912 on mount 910 to facilitate power transfer from mount 910 to computer mouse 800. Some implementations of removeable modular insert 820 may facilitate the coupling of power from hardwired external power sources (e.g., USB protocol), as would be appreciated by one of ordinary skill in the art with the benefit of this disclosure.

In some embodiments, removable modular insert 820 may incorporate a load switch or other system that can generate type data that corresponds to the type of external wireless power source. The type data can be sent to computer mouse 800 (e.g., processors 910), which can cause computer mouse 800 to change power consumption characteristics and/or change the energy buffer charging pace based on the type of external wireless power source wirelessly and electrically coupled to the removable modular insert 820. The type data can be a code that provides information including the amount of power available (e.g., 50 mA from powered mouse pad 140, >500 mA from a mount 910, etc.) from the wireless external power source, identification data, power capabilities, or the like, as would be appreciated by one of ordinary skill in the art with the benefit of this disclosure. Although external wireless power supplies are generally described as system for inductive power coupling, some embodiments (e.g., FIGS. 7-10) may harvest power from any suitable external wireless power source, not limited to inductively transferred power schemes (e.g., ultrasound, light, etc.), as would be appreciated by one of ordinary skill in the art with the benefit of this disclosure.

Figure 10:
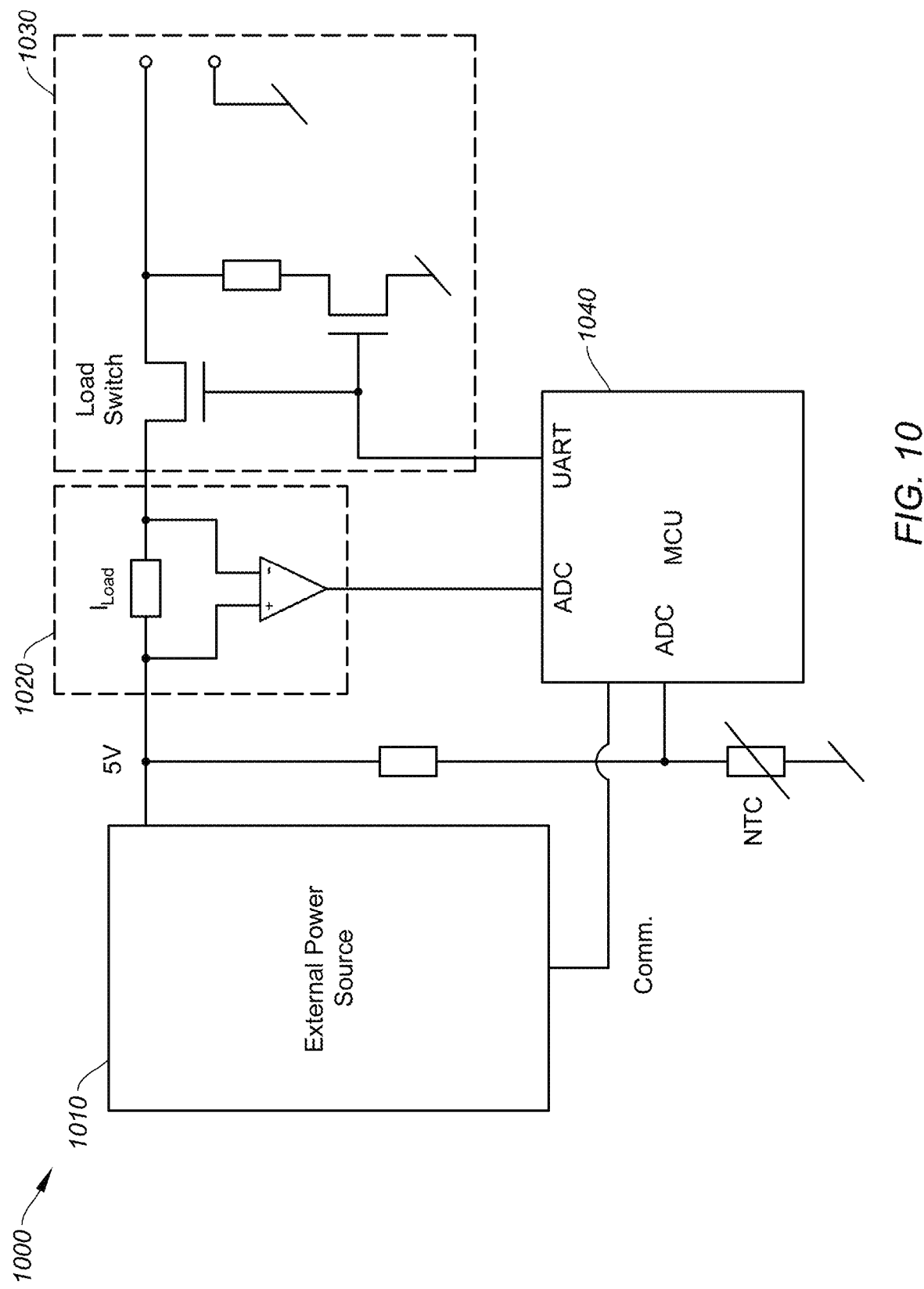
FIG. 10 is a simplified circuit diagram showing a system configured to control a charging rate of a computer mouse based on a type of external power source coupled to a removable modular insert, according to certain embodiments.

FIG. 10 is a simplified circuit diagram showing a system 1000 configured to control charging characteristics of a computer mouse (e.g., charging rate) based on a type of external power source (e.g., wireless or hardwired) coupled to a power interface circuit (e.g., removable modular insert), according to certain embodiments. In some aspects, the external power source may include the coil, rectifying circuitry, and power management electronics in a modular insert (e.g., coin), it can be 5 V from a cradle, or other device. In some aspects, the temperature control (e.g., NTC) may be configured to stationary chargers and not necessarily for charging during use on a mouse pad, so it can be omitted in certain embodiments, as would be appreciated by one of ordinary skill in the art with the benefit of this disclosure.

System 1000 can include an external power source 1010, such as powered mouse pad, which can be configured to provide power to the computer mouse (e.g., at MCU 1040) via the power interface circuit. Sensing block 1020 can be configured to receive the coupled wireless power from the external power source and determine an amount of sourced power. In some implementations, a comparator circuit and measure a voltage across a load resistor to determine a its current and corresponding power available from the external source, which can be communicated to MCU 1040 (processor(s) 210) of the computer mouse.

The sourced 5V can pass through load switch 1030, which can be configured to "chop" the voltage provided by the external power source (e.g., 5 V) into a binary coded signal by cycling between 0 and 5 V at a frequency (e.g., 2 kHz-10 kHz, or other suitable frequency(ies)), which can inform the computer mouse of the identity of the modular insert. The binary coded signal can be synchronous, asynchronous, symmetrical, asymmetrical, etc., and can be encoded in any suitable format, including non-binary codes, as would be appreciated by one of ordinary skill in the art with the benefit of this disclosure. The binary coded signal, or "type data," can correspond to the type of external power source that is wirelessly and electrically coupled to the power interface circuit. Thus, a powered mouse pad may have a first binary encoded signal (first type data) and a charging cradle may have a second binary encoded signal (second type data). The type data can sent to and used by MCU 1040 to identify the type of external power supply and change its charging characteristics accordingly. For example, as described above, a first type data may correspond to a powered mouse pad, thereby causing the computer mouse (e.g., system 200, system 500, or combinations thereof) to draw a maximum of 50 mA from the external power source, while a second type data may correspond to a charging cradle, thereby causing the computer mouse (e.g., system 200, system 500, or combinations thereof) to draw a substantially higher maximum current (e.g., >100 mA, >500 mA, <1 A, or other suitable charging rate). Load switch 1030 can be embodied by any suitable circuit architectural elements including field-effect transistors (FETs), as shown, bipolar junction transistors (BJTs), or other suitable network of active and/or passive elements configured to generate type data as described and herein, as would be appreciated by one of ordinary skill in the art with the benefit of this disclosure.

Exemplary Embodiments of Systems Using a Power Interface Circuit

In some embodiments, an input device (e.g., computer mouse) can include one or more processors; a power interface circuit electrically and communicatively coupled to the one or more processors, the power interface circuit operable to electrically couple to and receive power from a plurality of different types of external power sources including at least: a first type of external wireless power source operable to wirelessly provide power to the computer mouse at a voltage and a first current; and a second type of external wireless power source operable to wirelessly provide power to the computer mouse at the voltage and a second current, the second current being at least twice a magnitude of the first current. The power interface circuit can be operable to generate and send type data to the one or more processors indicating whether the first type of external power source or the second type of external wireless power source is wirelessly and electrically coupled to the power interface circuit. In some aspects, the one or more processors configure the computer mouse to change power consumption characteristics based on whether the first type or second type of external wireless power source is wirelessly and electrically coupled to the power interface circuit. The computer mouse can further include a housing configured in the computer mouse that is electrically and communicatively coupled to the one or more processors. The power interface circuit includes a removable modular insert configured to physically and electrically couple to the housing of the computer mouse in a complementary fit relationship. The removable modular insert is configured to be non-destructively coupled to and removed from the housing, and is operable to generate and send the type data to the one or more processors. The removable modular insert can include one or more magnets operable to mechanically help couple and align the removable modular insert with the housing and the second type of external power source.

The power interface circuit can be operable to receive power from the first type of external wireless power source while the computer mouse is moving along an underlying surface, the underlying surface being at least a portion of the first type of external power source, and the power interface circuit is configured such that it only receives power from the second type of external wireless power source while the computer mouse is substantially stationary. The type data from the power interface circuit may be a binary sequence (e.g., digital or analog sequence) that corresponds to the type of external power source. In some embodiments, the type data from the power interface circuit is a 5V binary sequence operating between 2 kHz-10 kHz.

In certain embodiments, the power interface circuit includes a load switch operable to convert a received voltage (e.g., DC, rectified DC, AC, etc.) into a binary sequence that operates as the type data that indicates whether the first type of external wireless power source or the second type of external wireless power source is wirelessly and electrically coupled to the power interface circuit. In some aspects, the load switch is comprised of one or more field-effect transistors (FETs) configured to operate as a switch that receives a 5V input voltage from the external power source and cycles an output of the load switch in a train of on/off states forming the binary sequence that operates as the type data, and typically between 2 kHz-10 kHz, although other binary sequence frequencies are possible.

In certain embodiments, the power interface circuit is further operable to mechanically and electrically couple to and receive power from one or more wired power sources including at least a third type of external power source operable to provide to the computer mouse at the voltage and a third current, the third current being at least twice the magnitude of the first current. In some cases, the first type of external wireless power source is a wireless charging mat, the second type of external wireless power source is a wireless charging mount or stand, or the third type of external power source is a wired universal serial bus protocol. In some implementations, the first type of external wireless power source provides 5 VDC at a maximum of 40-60 mA, and/or the second type of external wireless power source provides 5 VDC at a maximum of 100-500 mA. The one or more processors may control charging characteristics based on whether the first type or second type of external wireless power source is wirelessly and electrically coupled to the power interface circuit, the charging characteristics including a rate of charge, wherein the computer mouse is operable to charge one or more internal power storage devices at a first charging rate when the first type of external wireless power source is coupled to the power interface circuit, and charge one or more internal power storage devices at a second charging rate when the second type of external wireless power source is coupled to the power interface circuit, the second charging rate being at least double the first charging rate.

In some embodiments, the computer mouse can include one or more visual output elements, wherein the one or more processors are configured to operate the one or more visual output elements in a first operating output configuration when the first type of external wireless power source is coupled to the power interface circuit, and the one or more processors are configured to operate the one or more visual output elements in a second operating output configuration when the second type of external wireless power source is coupled to the power interface circuit, the first and second operating output configurations being different from each other. In some cases, the computer mouse can include an optical sensor controlled by the one or more processors, the optical sensor configured to detect movement of the computer mouse relative to an underlying surface and generate corresponding movement data. The computer mouse is operable to communicatively couple to a host computing device and to periodically generate and send an operational report to the host computing device. The operational report may include the movement data. In some aspects, when the second type of external wireless power source is coupled to the power interface circuit, the one or more processors are configured to prevent the movement data from being included in the operational reports.

Figure 11:
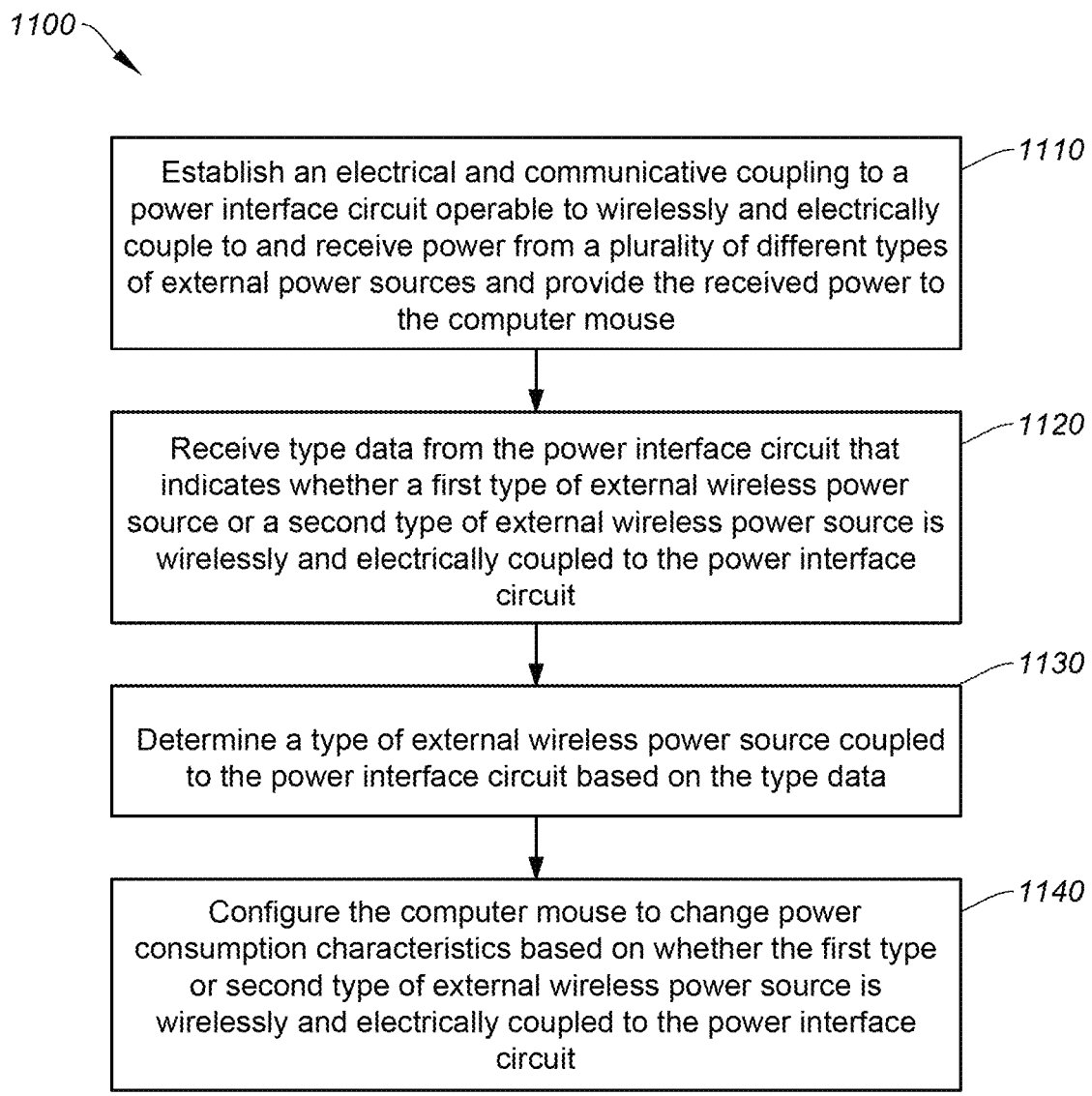
FIG. 11 is a flow chart showing a method of controlling a charging rate of a computer mouse, according to certain embodiments.

FIG. 11 is a simplified flow chart showing aspects of a method 1100 for controlling a charging rate of a computer mouse, according to certain embodiments. Method 1100 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 1100 can be performed by aspects of system 200, 710, 300, or any combination thereof. One of ordinary skill in the art with the benefit of this disclosure would appreciate the many modifications, variations, and alternative embodiments thereof.

At operation 1110, method 1100 can include establishing, by one or more processors, an electrical and communicative coupling to a power interface circuit operable to wirelessly and electrically couple to and receive power from a plurality of different types of external power sources and provide the received power to the computer mouse, according to certain embodiments.

At operation 1120, method 1100 can include receiving, by the one or more processors, type data from the power interface circuit that indicates whether a first type of external wireless power source or a second type of external wireless power source is wirelessly and electrically coupled to the power interface circuit, according to certain embodiments.

At operation 1130, method 1100 can include determining, by the one or more processors, a type of external wireless power source coupled to the power interface circuit based on the type data, according to certain embodiments.

At operation 1140, method 1100 can include configuring the computer mouse to change power consumption characteristics based on whether the first type or second type of external wireless power source is wirelessly and electrically coupled to the power interface circuit. In some aspects, the computer mouse includes a housing configured in the computer mouse that is electrically and communicatively coupled to the one or more processors. The power interface circuit may further include a removable modular insert (e.g., see FIG. 8) configured to physically and electrically couple to the housing of the computer mouse in a complementary fit relationship, and the removable modular insert can be configured to be non-destructively coupled to and removed from the housing. In some cases, the removable modular insert is configured to send the type data to the one or more processors. Configuring the computer mouse to change power consumption characteristics based on whether the first type or second type of external wireless power source is wirelessly and electrically coupled to the power interface circuit can include charging one or more internal power storage devices at a first charging rate when the first type of external wireless power source is determined to be coupled to the power interface circuit and charging one or more internal power storage devices at a second charging rate when the second type of external wireless power source is determined to be coupled to the power interface circuit, the second charging rate being at least double the first charging rate. In some implementations, the first type of external power source may be a wireless charging mat, and the second type of external power source can be a wireless charging mount or stand, as shown in FIG. 9.

It should be appreciated that the specific steps illustrated in FIG. 11 provide a particular method 1100 for controlling a charging rate of a computer mouse, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

Figure 12:
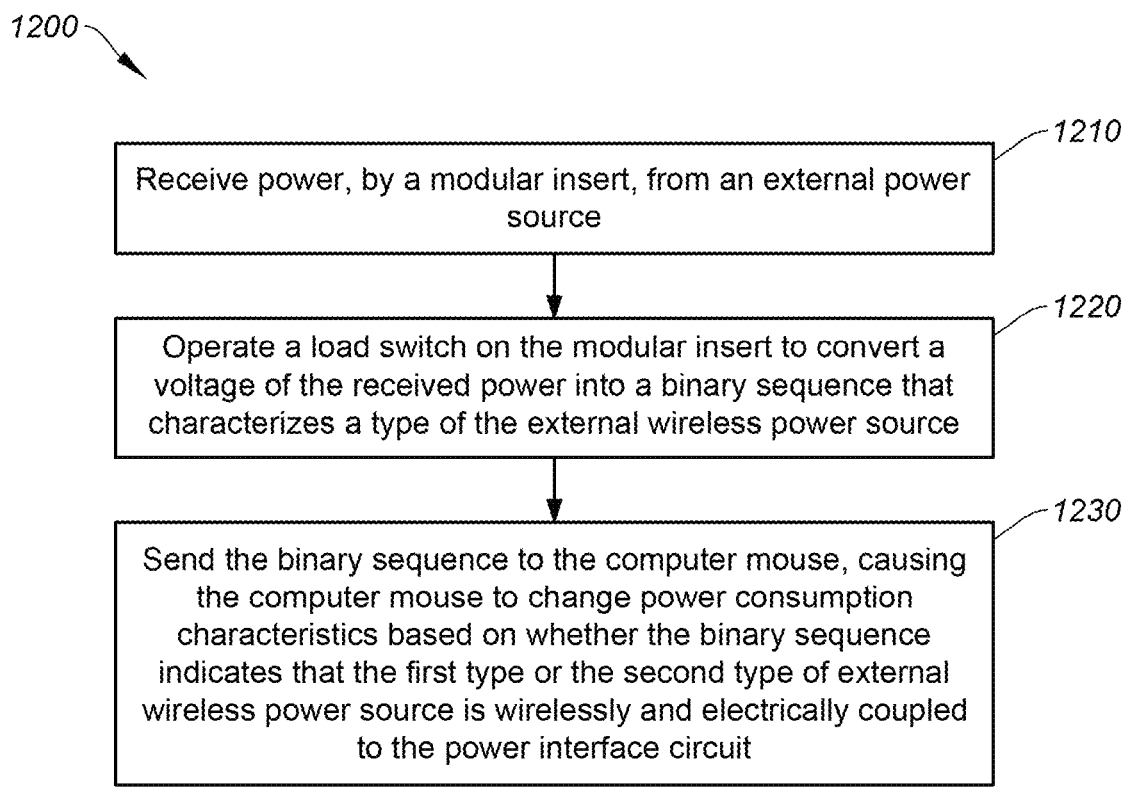
FIG. 12 is a flow chart showing a method of operating a modular insert for a computer mouse, according to certain embodiments.

FIG. 12 is a flow chart showing a method 1200 for operating a modular insert for a computer mouse, according to certain embodiments. Method 1200 can be performed by processing logic that may comprise hardware (circuitry, dedicated logic, etc.), software operating on appropriate hardware (such as a general-purpose computing system or a dedicated machine), firmware (embedded software), or any combination thereof. In certain embodiments, method 1100 can be performed by aspects of system 200, 710, 300, or any combination thereof. One of ordinary skill in the art with the benefit of this disclosure would appreciate the many modifications, variations, and alternative embodiments thereof.

At operation 1210, method 1200 can include receiving power, by a modular insert, from an external power source, wherein the modular insert is a power interface circuit configured to physically and electrically coupled to a housing of the computer mouse, wherein the modular insert is configured to be non-destructively coupled to and removed from the housing, according to certain embodiments.

At operation 1220, method 1200 can include operating a load switch on the modular insert to convert a voltage of the received power into a binary sequence that characterizes a type of the external wireless power source including a first type of external wireless power source and a second type of external wireless power source, according to certain embodiments. In some aspects, the load switch can include one or more field-effect transistors (FETs) configured to operate as a switch, wherein operating the load switch further includes cycling an output of the load switch that generates a train of on/off states forming the binary sequence, At operation 1230, method 1200 can include sending the binary sequence to the computer mouse, the binary sequence configured to cause the computer mouse to change power consumption characteristics based on whether the binary sequence indicates that the first type or the second type of external wireless power source is wirelessly and electrically coupled to the power interface circuit, according to certain embodiments. In some embodiments, the binary sequence operates between 2 kHz-10 kHz.

It should be appreciated that the specific steps illustrated in FIG. 12 provide a particular method 1200 for operating a modular insert for a computer mouse, according to certain embodiments. Other sequences of steps may also be performed according to alternative embodiments. Furthermore, additional steps may be added or removed depending on the particular application. Any combination of changes can be used and one of ordinary skill in the art with the benefit of this disclosure would understand the many variations, modifications, and alternative embodiments thereof.

In some embodiments, thermal protection may be employed. For instance, power transfer may be reduced, stopped, or modified in any suitable manner to accommodate thermal considerations for good input device performance characteristics, as would be appreciated by one of ordinary skill in the art with the benefit of this disclosure. In some embodiments, each charging implementation (e.g., 50 mA powered mouse pad, 500 mA charging cradle, etc.) may have a different binary pattern (type data). In some cases, one of the charging implementations may be a default mode (50 mA charging rate) that does not require type data to instantiate a default charging rate and only changes the charging rate (e.g., power consumption characteristics) when type data corresponds to an external power source other than the default type. One of ordinary skill in the art with the benefit of this disclosure would appreciate the many modifications, variations, and alternative embodiments thereof.

In some implementations, some computer mouse functionality may be changed based on the detected type of external power source. For instance, charging schemas that do not allow movement of the computer mouse (e.g., charging mat, charging cradle), certain human interface device (HID) reports may be suppressed or canceled (e.g., XY movement data) to help avoid possible deleterious signals (e.g., cursor jitter). In some aspects, LEDs can be used to provide a visual indication of the type of charging currently being employed. For instance, relatively slow charging via a powered mouse pad may cause the LEDs to operate in a first lighting pattern, and relatively fast charging via a charging cradle may cause the LEDs to operate in a second lighting pattern different than the first lighting pattern. In some embodiments, charging rates can be modified based on a current charge of internal charge storage devices (e.g., supercap), or in some cases the external power supply may be electrically decoupled when power is no longer needed.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C #or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
a housing configured to receive a removable first charge storage device;
an interface configured to wirelessly receive power from an external power source;
a second charge storage device; and
a multiplexor (MUX) including:
an output coupled to one or more processors; and
a set of inputs coupled to the first charge storage device, the interface, and the second charge storage device,
wherein the MUX is configured to electrically couple the interface to the one or more processors based on a determination that the external power source is electrically coupled to and providing power to the interface,
wherein the MUX is configured to electrically couple the second charge storage device to the one or more processors based on a determination that the external power source is electrically coupled to the interface but is not currently providing power to the interface, and
wherein the MUX is configured to electrically couple the first charge storage device to the one or more processors based on a determination that the first charge storage device is electrically coupled to the MUX and the external power source is not coupled to or not providing power to the interface,
wherein the second charge storage device is configured to be charged by the external power source via a charging circuit having a current limiter comprising:
a first low-dropout voltage (LDO) regulator circuit that is biased in a floating output configuration;
a second LDO regulator circuit configured to regulate its output voltage to a level that is within a normal operational range of the second charge storage device,
wherein the first LDO regulates its output voltage across an output resistor thereby generating a constant current that passes through the second LDO and charges the second charge storage device until the second LDO reaches and regulates at a predetermined voltage, thereby causing the first LDO to stop regulating until the output of the second LDO drops below the predetermined voltage.

2. The computer mouse of claim 1 wherein the removable first charge storage device is a removable battery, and wherein the first charge storage device is determined to be electrically coupled to the MUX when the first charge storage device has a voltage supply level above a threshold value.

3. The computer mouse of claim 1 wherein the interface is configured to receive a removable modular insert that, when inserted into the interface, enables the computer mouse to wirelessly receive power from the external power source.

4. The computer mouse of claim 3 wherein the external power source is a charging mouse pad configured to wirelessly provide power to the interface via electromagnetic induction when the computer mouse is placed on or near the charging mouse pad.

5. The computer mouse of claim 1 wherein the second charge storage device is a supercapacitor.

6. The computer mouse of claim 1 wherein a total allowed current supplied by the external power source is between 40-60 mA, wherein the external power source is configured to simultaneously provide power to the one or more processors and charge the second charge storage device without exceeding the total allowed current.

7. A method of operating a computer mouse comprising:
determining whether an external wireless power source is coupled to an interface configured to transfer power from the external wireless power source to a power management system;
selecting the external wireless power source to power the computer mouse based on a determination that the external wireless power source is electrically coupled to and providing power to the interface;
determining whether a fixed internal power source is coupled to a power management system;
selecting a fixed internal power source to power the computer mouse based on a determination that the fixed internal power source is coupled to the power management system and the external wireless power source is coupled to but not providing enough power to the interface,
determining whether a removeable internal power source is electrically coupled to the power management system in the computer mouse; and
selecting the removeable internal power source to power the computer mouse based on a determination that the removeable internal power source is electrically coupled to the power management system and the external power source is not coupled to the interface,
wherein the fixed internal power source is a charge storage device configured to be charged by the external power source via a charging circuit, the charging circuit including a current limiter comprising:
a first low-dropout voltage (LDO) regulator circuit that is biased in a floating output configuration; and
a second LDO regulator circuit configured to regulate its output voltage to a level that is within a normal operational range of the fixed internal power source,
wherein the first LDO regulates its output voltage across an output resistor thereby generating a constant current that passes through the second LDO and charges the fixed internal power source until the second LDO reaches and regulates at a predetermined voltage, thereby causing the first LDO to stop regulating until the output of the second LDO drops below the predetermined voltage.

8. The method of claim 7 wherein the removeable internal power source is a removeable charge storage device, and wherein the removeable internal power source is determined to be electrically coupled to the power management system when the removeable internal power source has a voltage supply level above a threshold value.

9. The method of claim 7 wherein the external power source is a charging mouse pad configured to wirelessly provide power to the power management system via electromagnetic induction when the computer mouse is placed on or near the charging mouse pad.

10. The method of claim 7 wherein the fixed internal power source is a supercapacitor.

11. The method of claim 7 wherein a total allowed current supplied by the external power source is between 40-60 mA, wherein the external power source is configured to simultaneously provide power to the power management system and charge the fixed internal power source without exceeding the total allowed current.

12. A system comprising:
one or more processors;
one or more machine-readable, non-transitory storage mediums that include instructions configured to cause the one or more processors to perform operations including:
  determining whether an external wireless power source is coupled to an interface configured to transfer power from the external wireless power source to a power management system of a computer mouse;
  selecting the external wireless power source to power the computer mouse based on a determination that the external wireless power source is electrically coupled to and providing power to the interface;
  determining whether a fixed internal power source is coupled to the power management system;
  selecting a fixed internal power source to power the computer mouse based on a determination that the fixed internal power source is coupled to the power management system and the external wireless power source is coupled to but not providing enough power to the interface;
  determining whether a removeable internal power source is electrically coupled to a power management system in the computer mouse; and
  selecting the removeable internal power source to power the computer mouse based on a determination that the removeable internal power source is electrically coupled to the power management system and the external power source is not coupled to the interface,
  wherein a charging circuit operable to charge the fixed internal source includes a current limiter comprising:
    a first low-dropout voltage (LDO) regulator circuit that is biased in a floating output configuration;
    a second LDO regulator circuit configured to regulate its output voltage to a level that is within a normal operational range of the fixed internal power source,
    wherein the first LDO regulates its output voltage across an output resistor thereby generating a constant current that passes through the second LDO and charges the fixed internal power source until the second LDO reaches and regulates at a predetermined voltage, thereby causing the first LDO to stop regulating until the output of the second LDO drops below the predetermined voltage.

13. The system of claim 12 wherein the removeable internal power source is a removable charge storage device, and wherein the removeable internal power source is determined to be electrically coupled to the power management system when the removeable internal power source has a voltage supply level above a threshold value.

14. The system of claim 12 wherein the external power source is a charging mouse pad configured to wirelessly provide power to the power management system via electromagnetic induction when the computer mouse is placed on or near the charging mouse pad.

15. The system of claim 12 wherein the fixed internal power source is a supercapacitor configured to be charged by the external power source via a charging circuit.

* * * * *